(12) United States Patent
Musgrave et al.

(10) Patent No.: US 11,639,905 B2
(45) Date of Patent: May 2, 2023

(54) AUTOMATED CIRCUMFERENTIAL PIPE SCANNING SYSTEM

(71) Applicant: Mistras Group, Inc., Princeton, NJ (US)

(72) Inventors: John Musgrave, Anchorage, AK (US); Elliott Morris, Anchorage, AK (US); Kelly Morris, Anchorage, AK (US)

(73) Assignee: Mistras Group, Inc., Princeton, NJ (US)

( * ) Notice: Subject to any disclaimer, the term of this patent is extended or adjusted under 35 U.S.C. 154(b) by 0 days.

(21) Appl. No.: 17/402,248

(22) Filed: Aug. 13, 2021

(65) Prior Publication Data

US 2023/0049542 A1    Feb. 16, 2023

(51) Int. Cl.
- *G01N 23/18* (2018.01)
- *G01N 23/083* (2018.01)
- *G01N 23/04* (2018.01)

(52) U.S. Cl.
CPC .............. *G01N 23/18* (2013.01); *G01N 23/04* (2013.01); *G01N 23/083* (2013.01); *G01N 2223/04* (2013.01); *G01N 2223/3303* (2013.01); *G01N 2223/40* (2013.01); *G01N 2223/628* (2013.01)

(58) Field of Classification Search
None
See application file for complete search history.

(56) References Cited

U.S. PATENT DOCUMENTS

| | | | |
|---|---|---|---|
| 2008/0267345 A1* | 10/2008 | Nagumo | G01N 23/046 378/11 |
| 2021/0190705 A1* | 6/2021 | May | G01N 23/083 |
| 2022/0099598 A1* | 3/2022 | Nisius | G01N 23/04 |

FOREIGN PATENT DOCUMENTS

| | | |
|---|---|---|
| EP | 3454049 A2 | 3/2019 |
| EP | 3798622 A1 | 3/2021 |
| GB | 2157930 A | 10/1985 |
| GB | 2211708 A | 7/1989 |
| WO | WO-2011023960 A1 | 3/2011 |

(Continued)

OTHER PUBLICATIONS

European Patent Office, Communication, Extended European Search Report issued for European Patent Application No. 22190182.0, dated Dec. 15. 2022, 10 pages.

(Continued)

*Primary Examiner* — Hoon K Song
(74) *Attorney, Agent, or Firm* — Norton Rose Fulbright US LLLP

(57) ABSTRACT

The present disclosure provide pipe scanning systems suitable for performing integrity and reliability inspection of pipelines, including insulated and non-insulated pipelines. The pipe scanning system may include a track disposed about a surface of the pipeline (e.g., on top of the insulation for insulated pipelines or on top of the pipe for non-insulated pipelines) and a scanning device mounted on the track via a drive carriage. The drive carriage includes components to facilitate movement of the drive carriage and the scanning device along the track such that the scanning device travels about the circumference of the pipeline. The scanning device includes an x-ray emitter and a digital x-ray detector that may capture media content indicative of a scanned section of the pipeline (e.g., a 360° circumferential scan), and the media content may be analyzed to detect the presence of one or more defects, such as corrosion under insulation (CUI).

22 Claims, 15 Drawing Sheets

(56) References Cited

FOREIGN PATENT DOCUMENTS

WO    WO-2013064838 A1    5/2013
WO    WO-2016176480 A1    11/2016

OTHER PUBLICATIONS

Redmer, B. et al. "Mobile 3D-X-Ray Tomography for Analysis of Planar Defects in Welds by 'TomoCAR'" 16th World Conference on Nondestructive Testing, Montreal, Quebec (Canada), Aug. 30-Sep. 3, 2004; 8 pages.

* cited by examiner

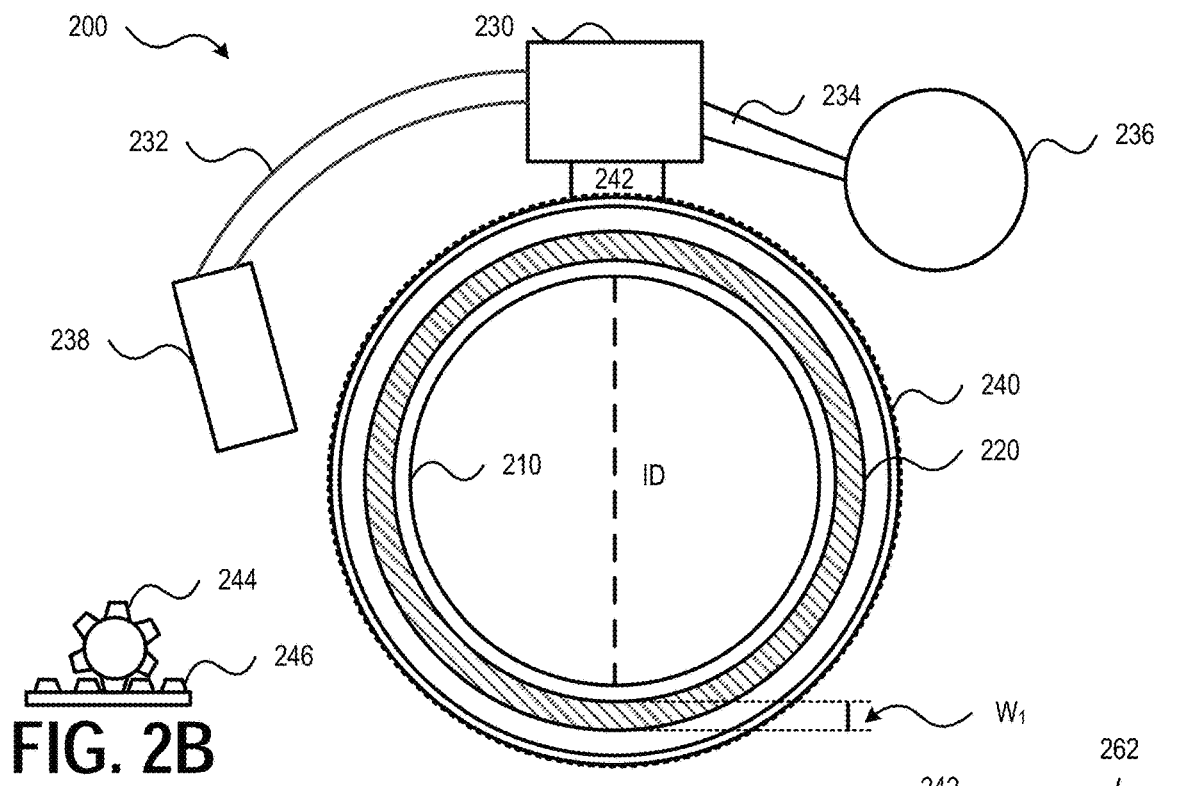
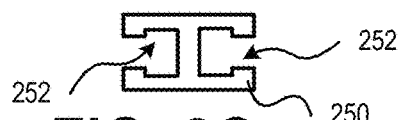
FIG. 2B
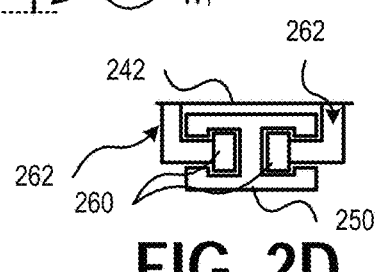
FIG. 2A
FIG. 2C
FIG. 2D
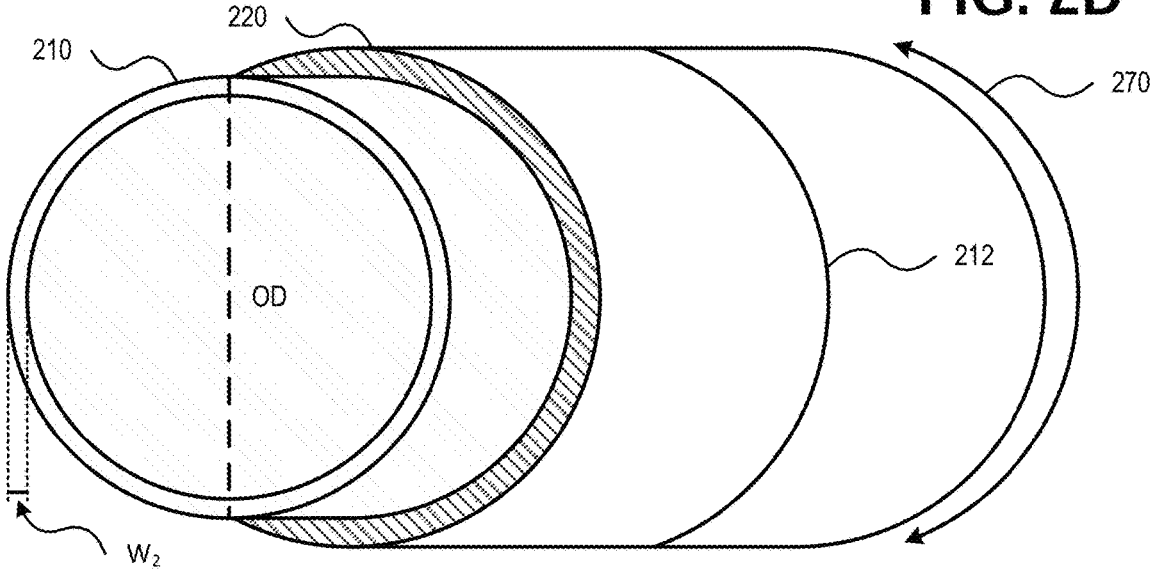
FIG. 3

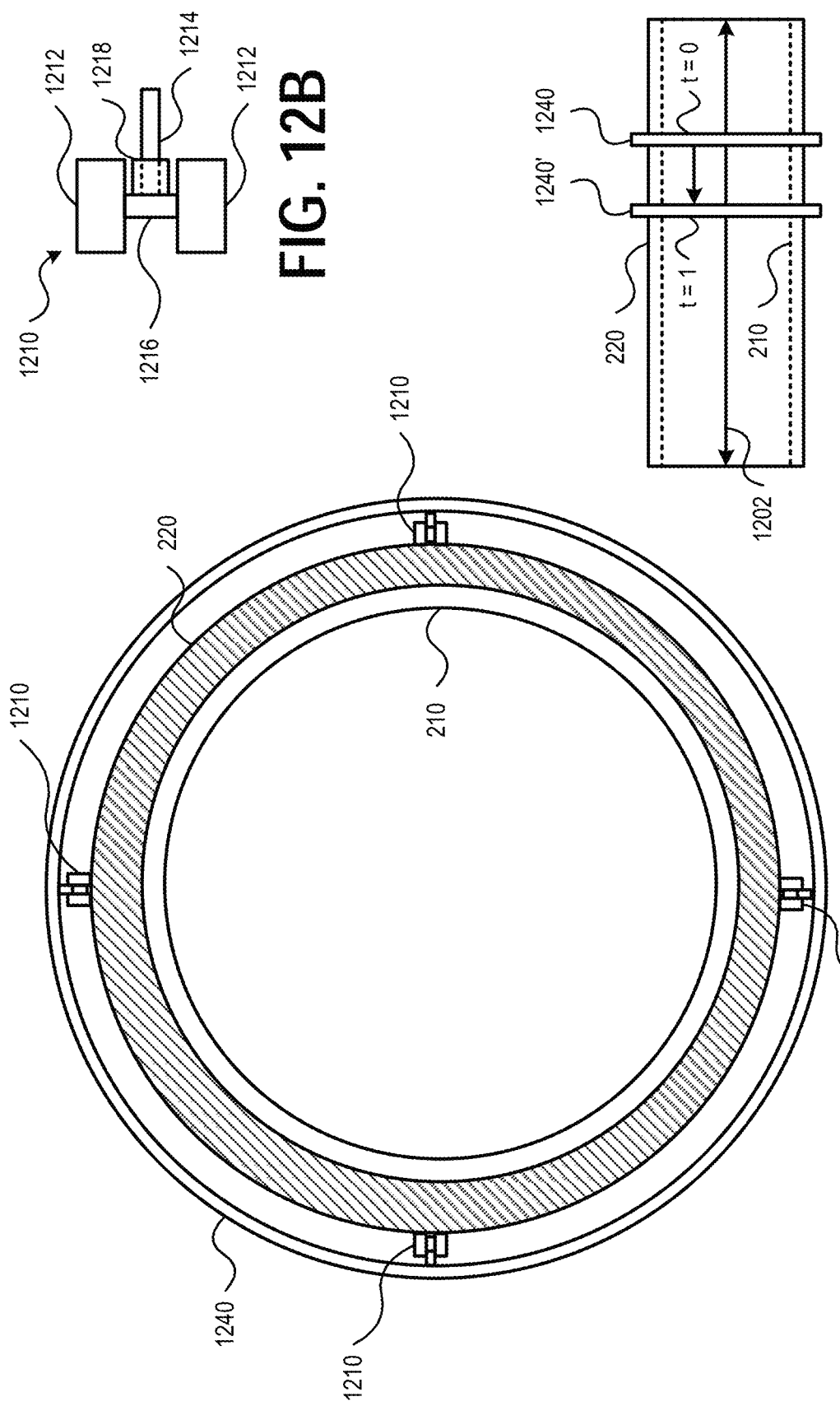

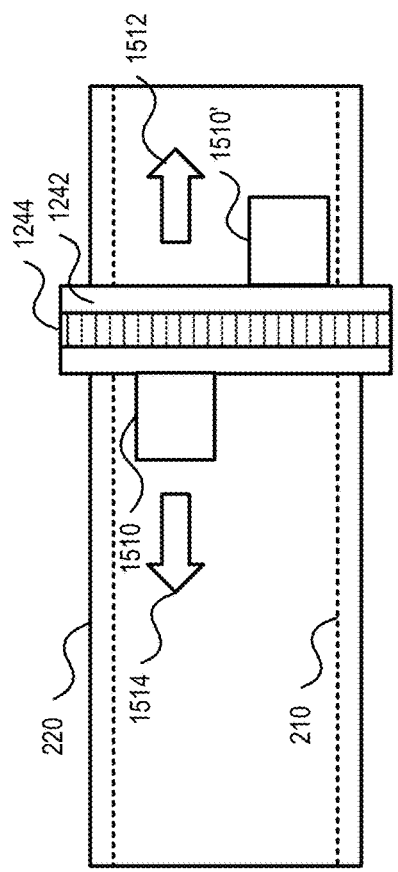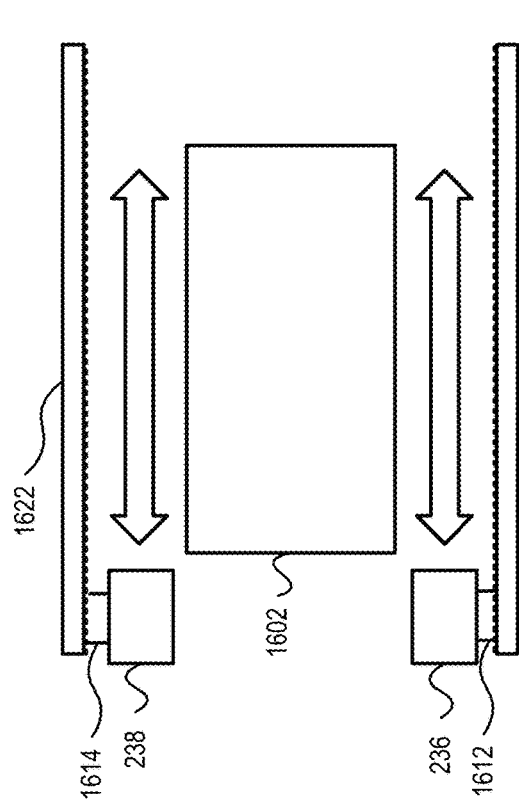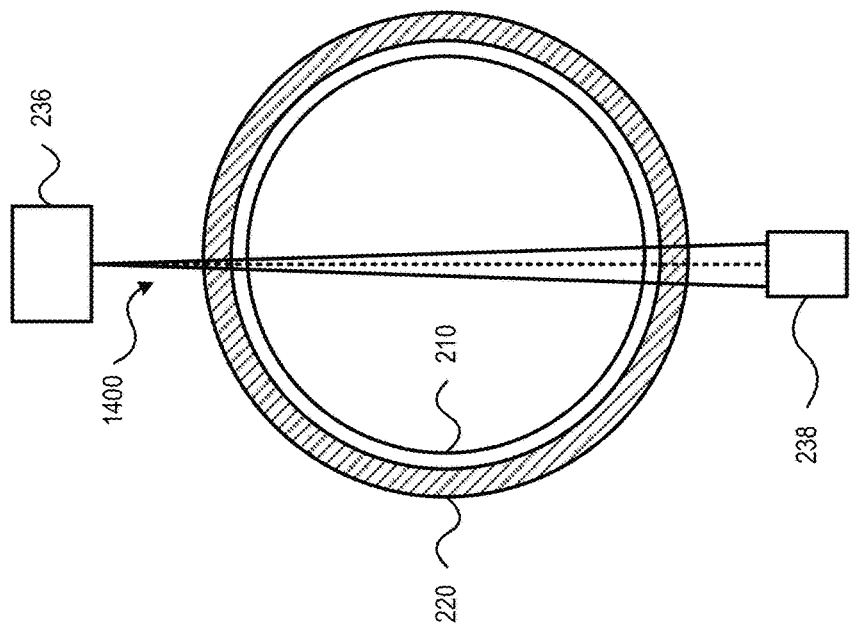

AUTOMATED CIRCUMFERENTIAL PIPE SCANNING SYSTEM

TECHNICAL FIELD

The present invention relates generally to structural integrity testing and more specifically to devices and techniques for identifying structural defects present in structures, such as pipes, piping, or pipelines.

BACKGROUND OF THE INVENTION

Pipelines are an efficient way to transport many different types of fluids, such as natural gas, oil, liquid butane, liquid propane, or other fluids, long distances. However, such pipelines may be subjected to various conditions that may degrade the structural integrity of the pipeline over time. Many testing destructive or non-destructive testing methods have been developed and applied to pipelines to ensure integrity and reliability. For example, magnetic flux leakage (MFL), ultrasonic, and eddy current based devices have been used to measure wall thickness on long pipelines. However, these inline methods require access to the internal surface of the pipeline and may not be used where access to the internal surface of the pipe is restricted and/or for plant piping with bends, elevation changes, or where a variety of pipe diameters are present.

Another challenge with respect to evaluating the integrity and reliability of pipelines is insulation. Many pipelines are insulated to protect the pipeline from external weather conditions (e.g., liquid butane and liquid propane may be transported at low temperatures and insulation may protect the temperature of the transported fluids from heat in the ambient environment of the pipeline). While providing some protection to the pipeline from external weather conditions, the presence of insulation also prevents a challenge with respect to pipeline integrity monitoring and inspection. For example, when a liquid (e.g., rainwater) penetrates the insulation it may become trapped, creating moisture between an exterior surface of the insulation and the pipeline. Over time, the trapped moisture may lead to the development of corrosion on the outside of the pipeline. Presently, detection and quantification of corrosion under insulation (CUI) is difficult to monitor and measure with a high degree of accuracy. Moreover, while some existing techniques exist to monitor and measure CUI, many of those techniques require internal access to the pipe, which may not be feasible in all situations. The additional existing techniques for measuring and monitoring CUI involve breaching the insulation barrier to allow access to the pipe surface, which is very costly, time consuming, and inefficient.

BRIEF SUMMARY OF THE INVENTION

The present invention is directed to pipe scanning systems. More particularly, the present invention is directed to pipe scanning systems that may be mounted to an exterior surface of a pipeline (e.g., an exterior surface of a pipe for non-insulated pipelines or an exterior surface of an insulation barrier for insulated pipelines) and that may provide 360° circumferential scans of a section of the pipeline. The pipe scanning system may include a track system disposed about a surface of the pipeline (e.g., on top of the insulation for insulated pipelines or on top of the pipe for non-insulated pipelines). A drive carriage may be configured to interface with or be secured to the track system. The drive carriage may include a motor, power source, and one or more drive components that may be used to move the drive carriage about the circumference of the pipeline along the track.

A scanning device may mounted on the drive carriage. The scanning device includes an x-ray emitter and a digital x-ray detector that may capture media content indicative of a scanned section of the pipeline (e.g., a 360° circumferential scan). For example, as the drive carriage moves about the circumference of the pipeline the emitter may output a scanning signal (e.g., x-rays) and the digital x-ray detector may detect the scanning signal. The digital x-ray detector may generate media content based on the detected scanning signal as the emitter and the detector move about the circumference of the pipeline, thereby providing a full 360° scan of the pipeline. In some aspects, multiple drive carriages may be utilized (e.g., a drive carriage for the emitter and a drive carriage for the detector). The media content output by the detector may be stored locally by the scanning device or may be transmitted to a remote computing device. The media content may be analyzed to detect the presence of one or more defects, such as CUI, moisture trapped in the insulation barrier, scratches or gouges on the surface of the pipe, corrosion or defects on the interior of the pipe, or other defects.

In some aspects, the pipe scanning system may be configured to be stationary—that is, it may be mounted to a section of the pipeline to facilitate a scan of that section, and then when the section is complete the pipe scanning system may be (manually) relocated to a new section of the pipeline where another section may be scanned. In some aspects, the pipe scanning system may include one or more lateral travel members (e.g., wheels, treads, etc.). The lateral travel members may be used to move the pipe scanning system along a length of the pipeline to facilitate scans of new sections of the pipeline (i.e., instead of having to manually move the pipe scanning system). Utilizing pipe scanning systems having lateral travel members may enable automated or semi-automated scanning of a length of pipeline in a more rapid fashion, which may improve the speed at which a pipeline may be scanned.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 2A is a block diagram of a pipe scanning system in accordance with aspects of the present disclosure;

FIG. 2B is a block diagram illustrating additional aspects of a pipe scanning system in accordance with of the present disclosure;

FIG. 2C is a block diagram illustrating additional aspects of a pipe scanning system in accordance with of the present disclosure;

FIG. 2D is a block diagram illustrating additional aspects of a pipe scanning system in accordance with of the present disclosure;

FIG. 3 is a block diagram illustrating aspects of a pipe scanning system in accordance with of the present disclosure;

FIG. 12A is a block diagram illustrating exemplary aspects of a pipe scanning system in accordance with the present disclosure;

FIG. 12B is a block diagram of an exemplary lateral traversal member for a pipe scanning system in accordance with the present disclosure;

FIG. 12C a block diagram illustrating aspects of scanning a pipeline using a pipe scanning system in accordance with the present disclosure;

FIG. 14 is a block diagram illustrating aspects of performing a scan of an interior of a pipeline in accordance with aspects of the present disclosure;

FIG. 15 is a block diagram illustrating additional aspects of providing lateral travel members for moving a scanning system along a length of a structure in accordance with aspects of the present disclosure;

FIG. 16 is a block diagram illustrating additional exemplary aspects of a scanning in accordance with the present disclosure;

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE INVENTION

Figure 1:
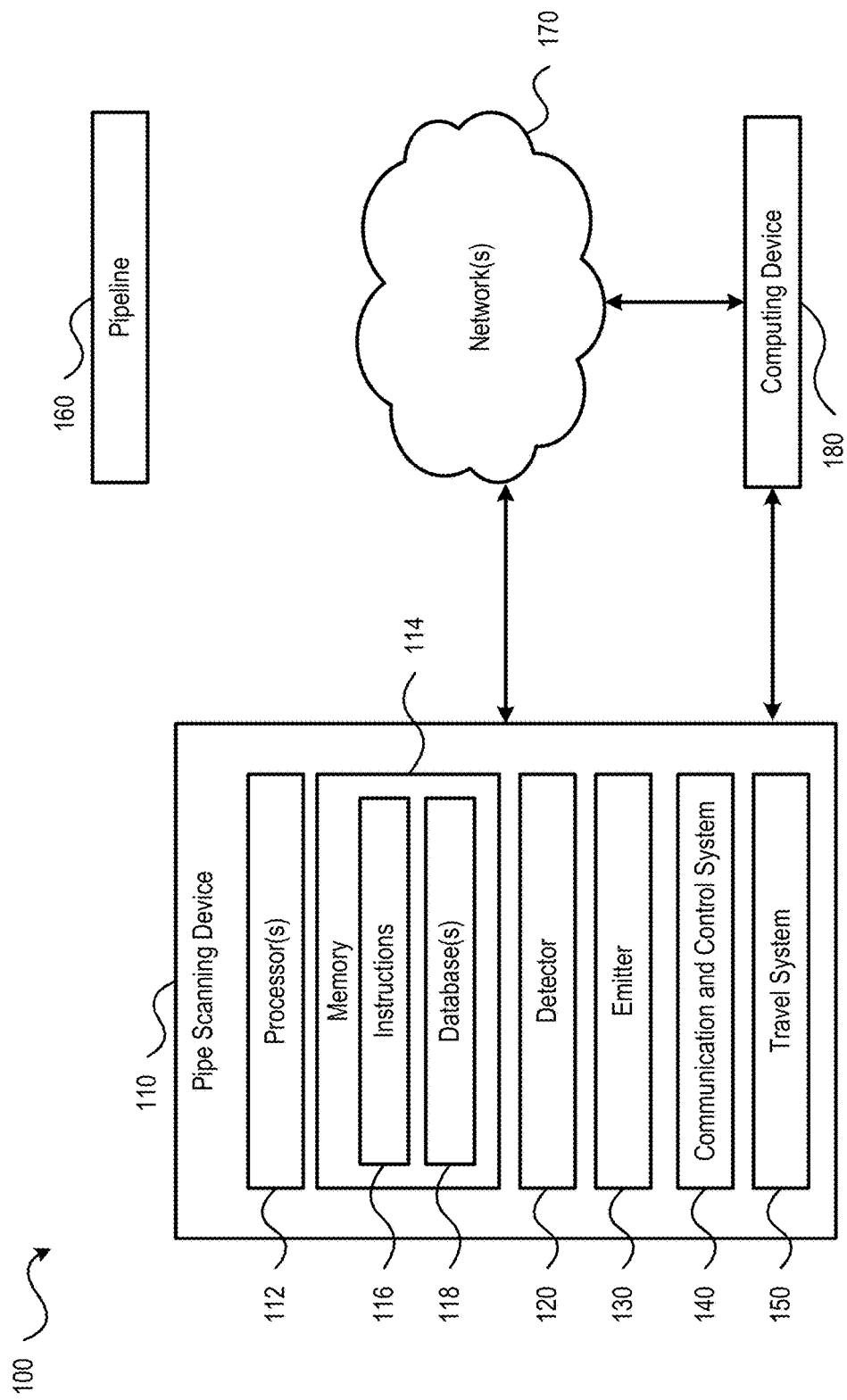
FIG. 1 is a block diagram of a pipe scanning system in accordance with aspects of the present disclosure.

Referring to FIG. 1, a block diagram of a pipe scanning system in accordance with aspects of the present disclosure is shown as a pipe scanning system 100. As described in more detail below, pipe scanning systems in accordance with the present disclosure may scan pipelines for defects. The scans may include circumferential scans obtained by traversing the pipe scanning system, or at least imaging components of the scanning system, around the circumference of an exterior of the pipeline. As the scanning is performed, media content (e.g., images, video, etc.) may be obtained for analysis, which may be used to identify defects present on the pipeline, such as CUI. As will be described in more detail below, pipe scanning systems in accordance with the present disclosure may be particularly well suited to monitor and identify CUI without requiring internal access to the pipeline and without breaching the insulation barrier of the pipeline. Moreover, it is to be understood that while aspects of the pipe scanning systems disclosed herein are primarily described with reference to scanning pipelines (e.g., insulated and non-insulated pipelines), the disclosed scanning systems and techniques may readily be applied to any type of pipe or piping and are not limited to use with pipelines.

As shown in FIG. 1, the pipe scanning system may include a pipe scanning device 110. The pipe scanning device 110 includes one or more processors 112, a memory 114, a detector 120, an emitter device 130, a communication and control system 140, and a travel system 150. The one or more processors 112 may include one or more microcontrollers, application specific integrated circuits (ASICs), field programmable gate arrays (FPGAs), central processing units (CPUs) having one or more processing cores, or other circuitry and logic configured to facilitate the operations of the pipe scanning device 110 in accordance with aspects of the present disclosure. The memory 114 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. As shown in FIG. 1, the memory 114 may store instructions 116. The instructions 116 may be executable by the one or more processors 112 to perform operations of the pipe scanning device 110, such as to control scanning of a pipeline or other operations, as described in more detail below. Additionally, the memory 114 may store information at one or more databases 118. Exemplary types of information that may be stored at the one or more databases 118 may include media content captured by the pipe scanning device 110, information associated with scanning operations performed by the pipe scanning device 110 (e.g., timestamp data indicating the date and time when a particular scan occurred, a number of scans performed for a particular pipeline, etc.), scan control data (e.g., information about the number of scans to be performed, a degree of the scanning, such as a full 360° circumference scan or a partial circumference scan, etc.), or other types of information.

The detector 120 may operate in combination with the emitter device 130 to capture media content during scanning of a pipeline. For example, the detector 120 may be a digital x-ray detector and the emitter device 130 may be an x-ray device configured to emit signals (i.e., x-rays) that may be detected by the detector 120. The detector 120 may convert the detected x-rays into media content (e.g., images, video, etc.) that may be used to detect defects present in the pipeline, such as CUI. As an non-limiting example, a Teledyne DALSA®, Model Shadowbox 1548 HS x-ray detector and a Teledyne® ICM CP-225D 225 Kv directional x-ray emitter device were used to construct a prototype scanning device used for proof-of-concept testing a scanning device consistent with the present disclosure. It is to be understood that the specific x-ray detectors and emitters described above have been provided for purposes of illustration, rather than by way of limitation and that other x-ray emitters and digital x-ray detectors may be utilized in accordance with aspects of the present disclosure. As non-limiting examples, scanning systems of the present disclosure may utilize field array detectors and/or linear detectors. In some aspects, the detector 120 and the emitter device 130 may be configured to image a particular width of pipeline per scanning session. For example, each scan may be configured to image a section of the pipeline having a width of at least 6", between 6" and 12", 12" and 18", 12" and 24", or another width depending on the particular detector 120 and emitter device 130 selected for the pipe scanning device 110. It is noted that wider detectors and emitters may be preferred as larger sections of the pipeline may be imaged per scan, which may enable the scanning of the pipeline to be performed more rapidly and with fewer scans.

The communication and control system 140 may be configured to control operations of the pipe scanning device 110. For example, the communication and control system 140 may be communicatively coupled to the emitter device 130 to control emission of x-rays and to receive media content based on x-rays detected by the detector 120. In some aspects, the communication and control system 140 may be configured to store the media content at the one or more databases 118. It is noted that storing the media content at the one or more databases 118 may require additional memory to be provided, such as additional HDDs or SSDs, which may increase the weight of the pipe scanning device 110, which may be undesirable. In additional or alternative aspects, the communication and control system 140 may be configured to transmit or stream the media content to a remote computing device 180 instead of storing the media content at the one or more databases 118. Streaming the media content to the remote computing device 180 may enable the pipe scanning device 110 to be lighter weight, which may be beneficial since the scanning device is particularly well suited for externally scanning insulated pipelines and the lighter weight may minimize the impact of the scanning on the insulation barrier of the pipeline.

In some aspects, the pipe scanning system 110 may be configured to record or output information associated with a location where the media content output to the computing device 180 was captured. For example, the pipe scanning system 110 may be configured to associate location information (e.g., a foot marker) with the media content, such as to indicate the media content being output was captured at "X" foot marker of the pipeline being scanned. The media content may also be timestamped to reflect the time that the specific section of the pipeline corresponding to the location information was scanned. In an aspect, the pipe scanning system 110 may be initialized with a starting location (e.g., a starting foot marker) and may automatically adjust the location as the pipe scanning system is moved laterally along a length of the pipeline, either manually or automatically, as described in more detail below. In some aspects, other forms of providing location information may be utilized, such as a global positioning system (GPS) and the like. In aspects, a new file (e.g., a video file, image file, etc.) may be created for each scanned section of the structure. The files corresponding to the media content captured by the pipe scanning system 110 may be created using a naming convention, such as to include the pipeline name, the section or location where the scan occurred, and a timestamp (e.g., "pipeline-X_126_07012021-14:23" indicating that the file corresponds to a scan of pipeline "X" at foot marker 126 on Jul. 1, 2021, at 2:23 PM).

To facilitate communication between the command and control system 140 and the remote computing device 180, the command and control system 140 may include one or more communication interfaces. The communication interfaces may be configured to communicatively couple the command and control system 140 to the remote computing device 180 via one or more networks 170 using wired or wireless communication links established according to one or more communication protocols or standards (e.g., an Ethernet protocol, a transmission control protocol/internet protocol (TCP/IP), an Institute of Electrical and Electronics Engineers (IEEE) 802.11 standard, an IEEE 802.16 standard, a 3rd Generation (3G) communication standard, a 4th Generation (4G)/long term evolution (LTE) communication standard, a 5th Generation (5G) communication standard, a peer-to-peer communication protocol, and the like).

In addition to providing functionality for controlling operations of the detector 120, the emitter device 130, and the transmission of the media content to the remote computing device 180, the command and control system 140 may also be configured to provide control signals to the travel system 150. For example, the pipe scanning device 110 may be configured to perform circumferential scanning of a pipeline 160, such as an insulated or non-insulated pipeline. To perform circumferential scanning, the travel system 150 may include a rotation system that may be secured to an exterior surface of the pipeline 160. The rotation system may include a guide or track that extends around the circumference of the pipeline 160. The travel system 150 may also include a drive carriage configured to be secured to the rotation system. The drive carriage may include a motor and one or more traction components to enable the drive carriage to move along the rotation system (e.g., the guide or track) and navigate about the circumference of the pipeline 160. The detector 120, the emitter device 130, and the communication and control system 140 may be coupled to the drive carriage so that the pipe scanning device 110 may be moved about the circumference of the pipeline 160 to perform imaging of the pipeline at a particular location where the travel system is located. In some aspects, the travel system 150 may also include lateral travel members configured to move the pipe scanning device 110 laterally along a length of the pipeline 160 in order to scan additional sections of the pipeline 160 (e.g., without having to remove and reinstall the travel system 150). Exemplary aspects of rotation systems and techniques for moving the pipe scanning device 110 about the circumference of the pipeline 160 and/or along a length of the pipeline 160 are described in more detail below.

Utilizing the pipe scanning device 110 to scan the pipeline 160 for defects provides several advantages over currently available pipeline scanning technologies. For example, the travel system 150 may enable the pipe scanning device 110 to image the entire surface of a section of the pipeline circumferentially in a single pass. Additionally, the use of the detector 120 and the emitter device 130 may enable detection of defects, such as CUI, present on insulated pipelines without requiring penetration of the insulation barrier, thereby minimizing the cost and time required to perform the inspection. Another advantage provided by the scanning devices of embodiments is the ability to scan larger sized pipelines (e.g., 20" and 36" pipelines) typically used for transmission of liquid butane and liquid propane and to capture higher resolution images of the pipeline, especially for pipelines having insulation that is greater than 2-5" thick. Moreover, the scanning systems disclosed herein are capable of being operated in high or low temperature environments and may even be operated in conditions that may otherwise prevent other inspection systems from being operated, such as rain.

Referring to FIG. 2A, a diagram illustrating aspects of a pipe scanning system in accordance with aspects of the present disclosure is shown as a pipe scanning system 200. In FIG. 2A, the pipe scanning system 200 includes a housing 230, an emitter 236, and a detector 238. In an aspect, the emitter 236 may be the emitter device 130 of FIG. 1 (e.g., an x-ray emitter) and the detector 238 may be the detector 120 of FIG. 1 (e.g., a digital x-ray detector). The housing 230 may be configured to retain components of a communication and control system (e.g., the communication and control system 140 of FIG. 1). For example, one or more processors (e.g., the one or more processors 112 of FIG. 1), memory (e.g., the memory 114 of FIG. 1), communication interfaces, or other circuitry and logic (e.g., a motherboard, etc.) for controlling operations of the pipe scanning system 200 may be disposed within the housing 230.

The emitter 236 may be coupled to the housing 230 via an arm 234 and the detector 238 may be coupled to the housing 230 via an arm 232. The arms 232, 234 may be secured to the housing 230 via one or more fasteners, such as screws, bolts, and the like. Additionally, the arm 232 may be secured to the detector 238 and the arm 234 may be connected to the emitter 236 via one or more fasteners, such as screws, bolts, and the like. In some aspects, the connection between the arm 232 and the detector 238 and/or the arm 234 and the emitter 236 may be adjustable. For example, during operation of the pipe scanning system 200 the emitter 236 may output signals (e.g., x-rays) and the detector 238 may be configured to detect the transmitted signals and convert the signals into media content (e.g., images, video, etc.) that may be used to detect defects with respect to the pipeline (e.g., defects with respect to the pipe, defects with respect to the insulation, or other defects). The angle or direction at which the emitter 236 outputs the signals may be adjustable to ensure that the signals are directed to a field of view of the detector 238. Additionally, the detector 238 may be adjusted such that its field of view is configured to receive or detect the signals output by the emitter 236.

The emitter 236 and the detector 238 may be communicatively coupled to the communication and control system via wired or wireless communication links. The communication and control system is configured to provide control signals to control operations of the emitter 236 and the detector 238. For example, the communication and control system may provide a control signal to the emitter 236 to cause the emitter 236 to output the scanning signals (e.g., x-rays). Similarly, the communication and control system may output a control signal to the detector to cause the detector to start detection of the signals output by the emitter. As the detector 238 detects the signals output by the emitter 236, data associated with the detected signals may be received by the communication and control system. As explained above, the data associated with the detected signals may include media content and the communication and control system may be configured to store the media content (e.g., in a database at the memory of the communication and control system) or transmit (e.g., via peer-to-peer communication links or network communication links) the media content to a remote computing device (e.g., the computing device 180).

As shown in FIGS. 2A and 3, the pipe 210 has an inner diameter (ID) (FIG. 2) and an outer diameter (OD) (FIG. 3). In some aspects, the OD of the pipe 210 may be 20" or 36" (e.g., pipe diameters commonly used for pipelines transmitting liquid butane or liquid propane). It is noted that pipes having ODs of 20" and 36" have been described for purposes of illustration, rather than by way of limitation and that the pipe scanning systems disclosed herein may be readily utilized with pipelines having pipes with ODs greater than 36", less than 20", or between 20" and 36". The insulation 220 may have a width ($W_1$) and the pipe 210 may have a width ($W_2$). In some aspects, the width ($W_1$) may be less than 5". In additional or alternative aspects, the width ($W_1$) may be greater than or equal to 5". During scanning of the pipeline the media content obtained from the detector 238 may be utilized to determine whether defects are present in the pipe 210 and/or the insulation 220. For example, when CUI occurs, the exterior surface of the pipe 210 may exfoliate, increasing the width ($W_2$) of the pipe 210. Thus, the media content captured by the pipe scanning system 200 may be analyzed to identify sections of the pipe 210 where the structural integrity may have become degraded (e.g., via CUI or another defect). Notably, that the pipe scanning system 200 enables detection of defects, such as CUI, without requiring penetration of the insulation 220 and provides high resolution imaging of the pipe 210 despite the presence of the insulation 220, even when the width ($W_2$) is 5" or greater, as described in more detail below.

The pipe scanning system 200 includes a travel system, which may include a track 240 and a drive carriage 242. The track 240 may be configured to surround a circumference of a pipeline that includes a pipe 210 and insulation 220 and may serve as a guide for controlling traversal of the circumference 212 of the pipeline by the scanning system 200. It is noted that while FIG. 3 illustrates the circumference 212 of the pipeline as being the circumference of both the pipe 210 and the insulation 220, the pipe scanning system 200 may be readily utilized for non-insulated pipelines, in which case the circumference of the pipeline may correspond to a circumference of the pipe 210.

The drive carriage 242 includes a motor (e.g., an electric motor) and one or more drive components to facilitate movement of the pipe scanning system 200 along the track 240. For example and as shown in FIG. 2B, where the track 240 is a cogged track 246, the one or more drive components may include one or more gears or cogs 244 configured to interface with the cogged track 246 such when the gears or cogs 244 are driven in a first direction by the motor, the drive carriage 242 may travel along the track 240 in a first direction, and when the gears or cogs 244 are driven in a second direction, the drive carriage 242 may travel along the track 240 in a second direction opposite the first direction. As shown in FIG. 2C, in some implementations the track 240 may be a channel track 250 that includes one or more channels 252. In implementations where the track 240 is a channel track, the one or more drive components may include wheels 260 mounted on channel interfaces 262 as shown in FIG. 2D. The wheels 260 may configured to securely sit within the channels 252 and may be driven in a first direction by the motor to move the pipe scanning system along the track 250 in a first direction and may be driven in a second direction to move the pipe scanning system 200 in a second direction opposite the first direction. It is noted that the exemplary track systems and drive components shown in FIGS. 2B-2D have been shown for purposes of illustration, rather than by way of limitation and that additional track systems and drive components may be utilized to move the pipe scanning systems configured in accordance with the present disclosure about a circumference of a pipeline.

As shown in FIG. 2A, the housing 230 may be mounted on or otherwise secured to the drive carriage 242. As described above with reference to FIGS. 2B-2D, as the drive components of the drive carriage 242 are driven in a particular direction by the motor, the housing 230 travels along the track 240 about the circumference 212 of the pipeline. Moreover, because the emitter 236 and the detector 238 are coupled to the housing 230 via the arms 234, 232, respectively, as the drive carriage 242 and the housing 230 travel about the circumference 212 of the pipeline, the emitter 236 and the detector 238 may also travel about the circumference 212 of the pipeline, thereby enabling a full 360° scan of a section of the pipeline to be scanned. It is noted that the size of the section (e.g., the width of the scan along the length of the pipeline) may be dependent on the size of the detector 238 and the emitter 236. Further, it is noted that the scans may be performed in multiple directions. For example, a first scan may be performed as the pipe scanning system 200 travels about the circumference of the pipeline in a first direction and a second scan may be performed (of the same section of the pipeline) as the pipe scanning system 200 travels about the circumference of the pipeline in a second direction opposite the first direction, as shown by arrow 270 of FIG. 3. To illustrate, starting from a first location along the track 240, the pipe scanning system 200 may travel about the circumference 212 of the pipeline until the pipe scanning system 200 arrives back at the first location. Once the first scan is complete, the pipe scanning system 200 may travel about the circumference in the second direction a second scan may be performed and may be completed when the pipeline scanning arrives back at the first location. It is noted that while full 360° scans may be performed by the pipe scanning system 200, in some use cases a less than 360° scan may be performed (e.g., by traversing the pipe scanning system 200 about a portion of the circumference 212 of the pipeline).

It is noted that additional sensors or instruments may be utilized by scanning systems of embodiments to capture additional data as the scanning is performed. For example, a scanning system of embodiments may include infrared sensors, a GPS, alternating current field measurement systems (e.g., for detecting stress corrosion or cracking on welds, etc.), a digital camera, one or more lasers and laser sensors, or other types of sensors. These additional sensors may be utilized to provide supplemental or additional information during scanning. For example, the infrared sensor may be configured to provide infrared images that may be synchronized to the outputs of the detector 238. Additionally, the camera may be utilized to capture an image of the surface where a defect is detected. To illustrate, when a user detects a defect based on the media content output during scanning, the user may manually position the scanning system such that the camera is pointed at the location where the defect was identified and capture an image. The one or more lasers and laser sensors may be configured to perform laser pit mapping, which may produce a point cloud that includes information associated with a contour of the surface of the scanned structure. Additionally, a laser encoder may be provided and used to correct for travel irregularities, which may provide higher levels of precision and enable very small defects to be found. The higher levels of precision provided by the laser encoder may also be beneficial for other reasons, such as for code inspection. In aspects, the point cloud may have sufficient resolution to provide information indicative of the presence of small pits or depressions on the surface of the scanned structure, as well as other types of information about the contour of the surface of the scanned structure and defects present on the scanned structure (e.g., a pit or depression may be representative of corrosion on the surface of the scanned structure). Utilizing laser pit mapping techniques may provide an additional advantage over merely using the scanning systems of embodiments, such as to detect defects that may be too small to see (e.g., with the human eye or may be difficult to spot based on streamed image content that is constantly changing as the scanning system traverses a track system corresponding to the structure being scanned) using the tangential scanning techniques, described in more detail with reference to FIG. 4A. The GPS sensor may be used to capture location information regarding the location along the structure (e.g., a pipe, pipeline, piping, etc.) where the defect was identified, which may enable a repair to be more easily made. It is noted that these exemplary sensors may be utilized individually (e.g., scanning system with only a infrared sensor, or only a GPS sensor, or only a camera, or only a laser/sensor system for performing laser pit mapping, etc.) or in combination (e.g., two or more of the above-described additional sensors or other sensors).

Figure 4B:
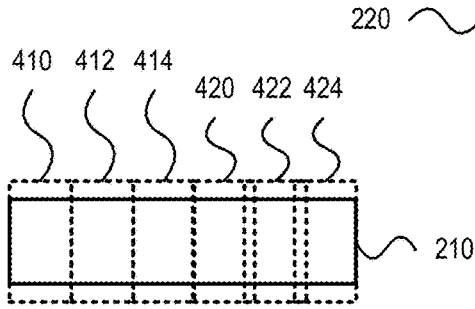
FIG. 4B is another block diagram illustrating aspects of scanning a pipeline using a pipe scanning system in accordance with the present disclosure.
Figure 4A:
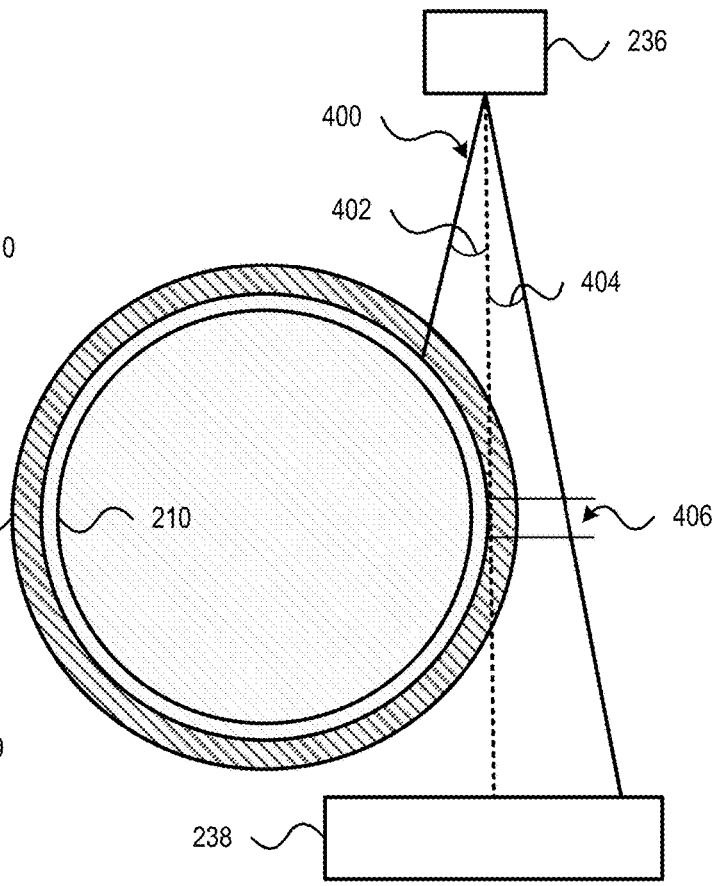
FIG. 4A is a block diagram illustrating aspects of scanning a pipeline using a pipe scanning system in accordance with the present disclosure.

Referring to FIG. 4A, a block diagram illustrating aspects of scanning a pipeline using a pipe scanning system in accordance with the present disclosure is shown. As illustrated in FIG. 4A, the emitter 236 may output a signal 400 (e.g., x-rays). At least a portion 404 of the signal 400 may be detected by the detector 238. In some aspects, a portion of the signal 402 may not be received by the detector 238. The portion 404 of the signal 400 that is detected by the detector 238 may be converted to media content indicative of a portion of a surface of the pipeline, such as the portion of the surface of the pipeline proximate region 406 shown in FIG. 4A. In particular, the media content associated with the portion of the pipeline proximate region 406 may provide information that indicates whether a defect, such as CUI, is present at the surface of the pipeline in the vicinity of region 406, as described in more detail below with reference to FIGS. 5A-5D and FIGS. 8A-10B.

It is noted that media content captured for the portion 406 of the pipeline may not provide information about the presence of defects in other portions of the pipeline. However, as the pipe scanning system traverses the circumference of the pipeline the scanning may capture information associated with the entirety of the section of the pipeline being scanned. For example, and referring to FIG. 4B the entirety of a pipeline may be scanned via sequential scans of different sections 410, 412, 414, 420, 422, 424 of the pipe 210 (and the insulation for insulated pipelines). Moreover, it is noted that the scanning may be performed via scans of non-overlapping sections of the pipeline, as shown at 410, 412, 414, scans of partially overlapping sections of the pipeline 420, 422, 424, or a combination of overlapping and non-overlapping sections of the pipeline. As explained above, during the scanning of each section of the pipeline, one or more full 360° scans about the circumference of the pipeline may be performed or if desired, less than full 360° scans about the circumference of the pipeline may be performed.

Figure 5A:
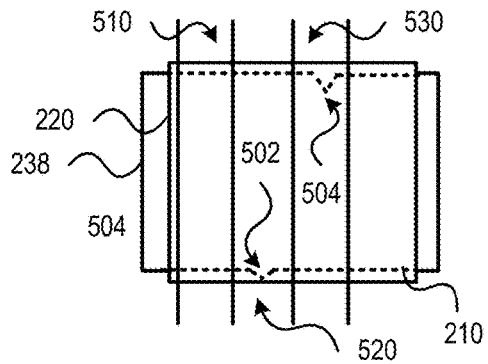
FIG. 5A is a block diagram illustrating aspects of detection of defects in a pipeline in accordance with the present disclosure.

Referring to FIG. 5A, a block diagram illustrating aspects of identifying defects using a pipe scanning system in accordance with the present disclosure is shown. As explained above with reference to FIG. 4B, scanning of a pipeline may occur at multiple locations along the length of a pipeline, where each scan is configured to capture image data associated with a least a portion of the pipeline, such as the scans 410, 412, 414, 420, 422 of FIG. 4B. It is noted that the scans may capture image data associated with non-overlapping sections of the pipeline (e.g., the scans 410, 412, 414 of FIG. 4B) or may capture image data associated with overlapping sections of the pipeline (e.g., the scans 420, 422 of FIG. 4B) depending on the particular configuration of the pipe scanning system. In some aspects, each scan may include one or more scans of the full circumference of a particular section of the pipeline (e.g., 360° scans). In additional or alternative aspects, one or more partial circumference scans (e.g., scans of less than) 360° of a particular section of the pipeline may be performed. It is also noted that scanning of a pipeline in accordance with the concepts disclosed herein may include a combination of full circumference and partial circumference scans (i.e., some sections of the pipeline may be imaged using full circumference scans and other sections of the pipeline may be imaged using partial circumference scans).

Referring to FIG. 5A, a block diagram illustrating aspects of identifying defects of a pipeline using a pipe scanning system in accordance with the present disclosure is shown. As shown in FIG. 5A, scanning of a pipeline may involve scanning a pipeline that includes a pipe 210. In some aspects, the pipe 210 may be wrapped or covered by insulation 220. Scanning of the pipeline may occur via scans of various sections of the pipe 210 (and the insulation 220). For example, the scanning may involve a scan of a section 510 of the pipeline, a scan of a section 520 of the pipeline, and a scan of a section 530 of the pipeline. In the example illustrated in FIG. 5A, section 510 may be free from defects, but section 520 of the pipeline may include a defect 502 and section 530 may include a defect 504.

Figure 5B:
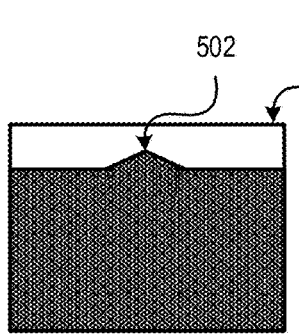
FIG. 5B is another block diagram illustrating aspects of detection of defects in a pipeline in accordance with the present disclosure.
Figure 5C:
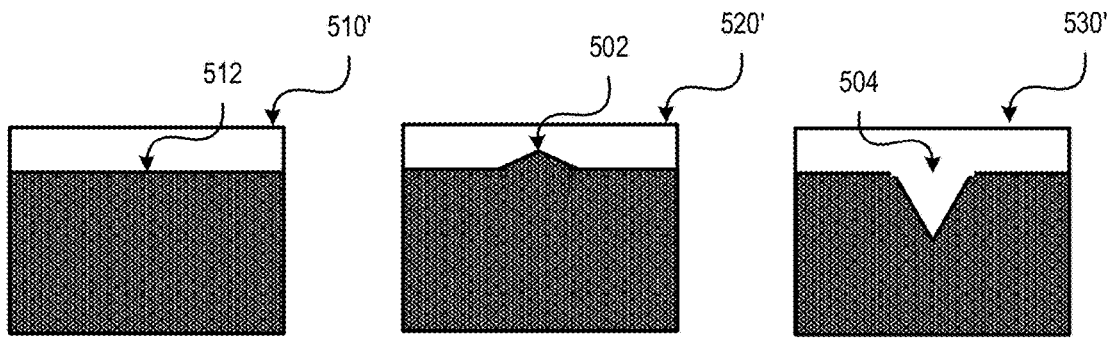
FIG. 5C is yet another block diagram illustrating aspects of detection of defects in a pipeline in accordance with the present disclosure.
Figure 5D:
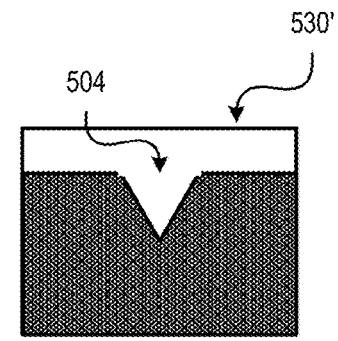
FIG. 5D is an additional block diagram illustrating aspects of detection of defects in a pipeline in accordance with the present disclosure.

Image data may be captured during the scanning of each of the sections 510, 520, 530. For example, image data 510' may be captured during scanning of the section 510, image data 520' may be captured during scanning of the section 520, and image data 530' may be captured during scanning of the section 530. The image data 510', 520', 530' captured during the scanning of each of the sections 510, 520, 530 may be used to determine that the section 510 is free from defects and that defects are present in sections 520, 530. For example, FIGS. 5B-5D show diagrams illustrating aspects of image data that may be captured during the scanning of the sections 510, 520, 530 of the pipe 210. In particular, FIG. 5B shows the image data 510' captured during the scanning of section 510, FIG. 5C shows the image data 520' captured during the scanning of section 520, and FIG. 5D shows the image data 530' captured during the scanning of section 530. As shown in FIG. 5B, the surface 512 of the pipe 210 may be smooth, which may signify that no defects are present, or at least that no defects are present on the exterior surface of the pipe 210 or within the insulation 220 (if present). As described above, when corrosion occurs for an insulated pipeline, the corrosion may appear as an exfoliation of layers on the exterior surface of the pipe 210. Such corrosion may appear as a raised surface of the pipe 210 at the location of the defect 502, as shown in the image data 520' of FIG. 5C. The defect 504 may correspond to a gouge or scratch along the circumference of the pipe 210, which may show up as a depression in the surface of the pipe 210 at the location of the defect 504, as shown in the image data 530' of FIG. 5D. As can be seen in FIGS. 5B-5D, using pipe scanning systems in accordance with aspects of the present disclosure may enable various types of defects to be identified during scanning of a pipeline (e.g., an insulated pipeline or non-insulated pipelines).

Figure 6:
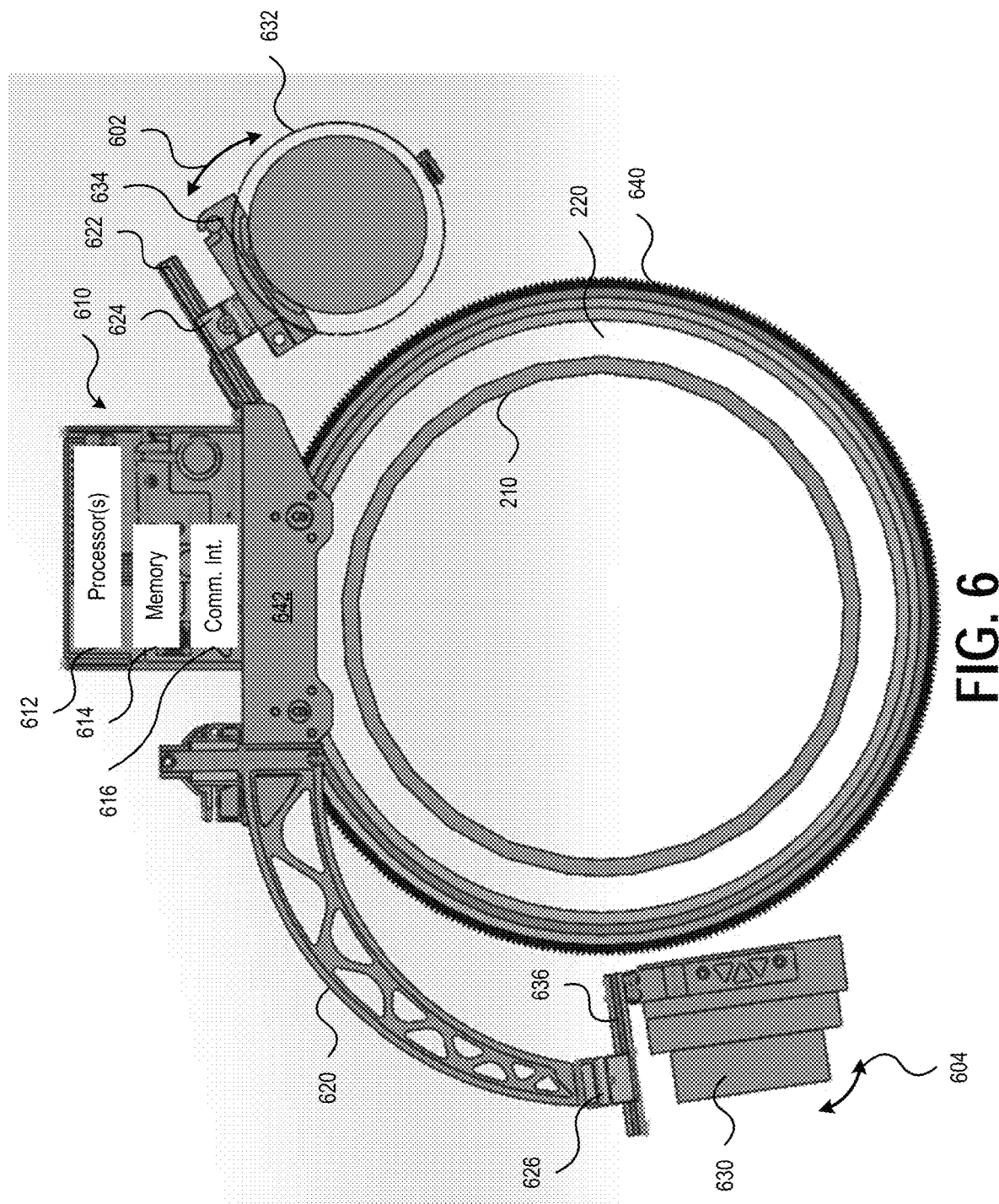
FIG. 6 is a diagram illustrating a profile view of a pipe scanning system in accordance with the present disclosure shown from the perspective of a cross section of the pipeline.
Figure 7:
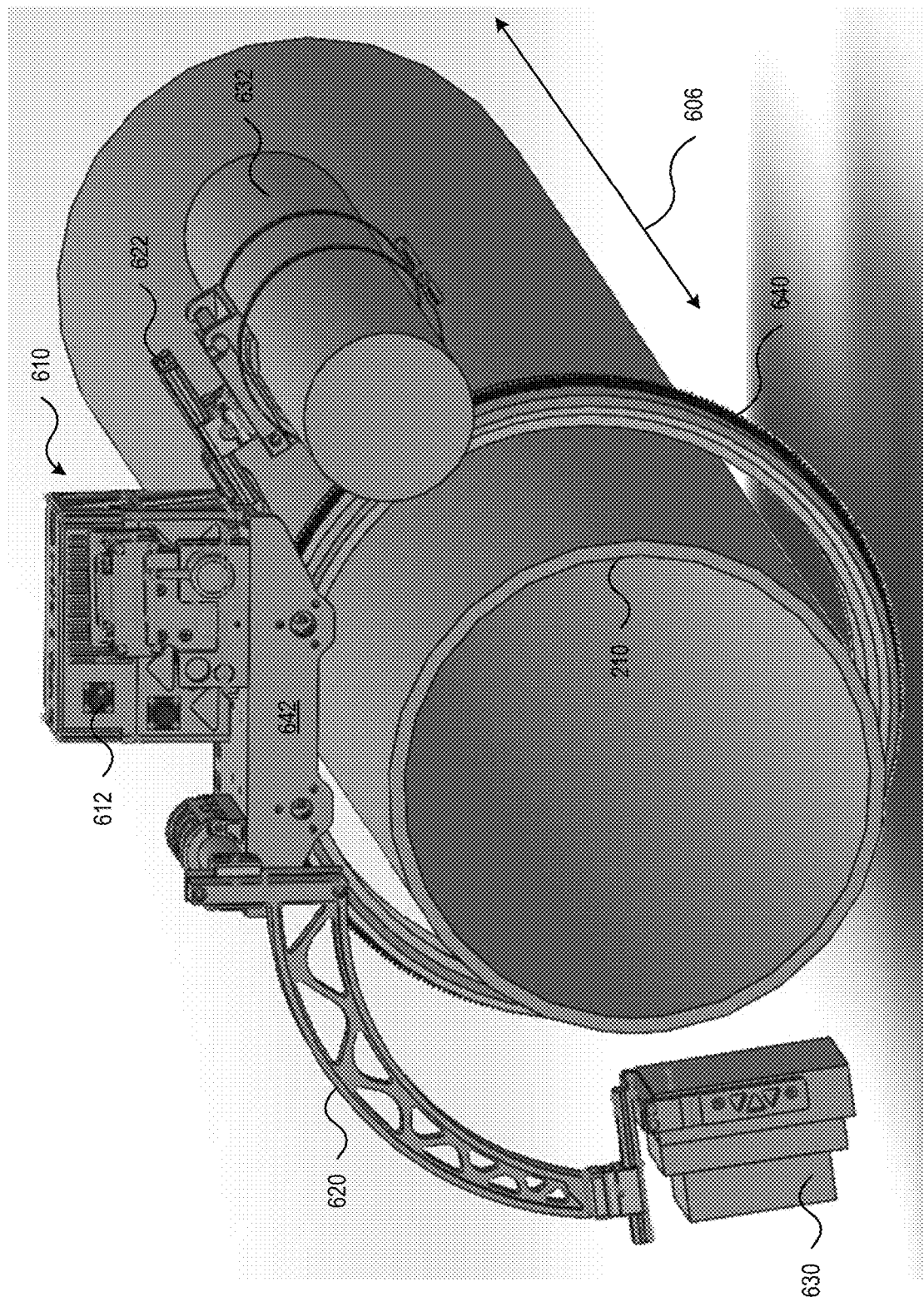
FIG. 7 is a diagram illustrating a perspective view of a pipe scanning system in accordance with the present disclosure.

Referring to FIGS. 6 and 7, diagrams illustrating an exemplary pipe scanning system according to aspects of the present disclosure are shown. In particular, FIG. 6 illustrates a profile view of a pipe scanning system shown from the perspective of a cross section of a pipeline and FIG. 7 illustrates a perspective view of the pipe scanning system mounted on the pipeline. As shown in FIGS. 6 and 7, the exemplary pipe scanning system includes a track 640 mounted about a circumference of an insulated pipeline having the pipe 210 and insulation 220. In some aspects, the track 640 may be the track 240 described and illustrated with reference to FIGS. 2A-2D. The pipe scanning system also includes a drive carriage 642 mounted on the track 640. As described above with reference to FIGS. 2A-2D, the drive carriage may include a motor, one or more drive components (e.g., components that may be driven by the motor to move the pipe scanning system along the track in a first direction or a second direction), a power source (e.g., a battery pack, a battery cell, etc.), or other components (e.g., components to secure the drive carriage 642 to the track 640, bearings, and the like). As can be appreciated from the profile view of FIG. 6, as the motor of the drive carriage 642 drives the one or more drive components in a particular direction, the pipe scanning system may travel about the entire circumference of the pipeline, thereby enabling a full 360° scan of a section of the pipeline (e.g., one of the sections 410, 412, 414, 420, 422, 424 of FIG. 4B or one of the sections 510, 520, 530 of FIG. 5A) to be performed. In some aspects, one or more solar panels (not shown) may be provided to recharge the power source. Including the one or more solar panels may enable the pipe scanning system to operate for longer periods of time without recharging. It is noted that while the solar panels may increase the weight of the pipe scanning system, the additional weight may be at last partially offset by being able to use a smaller power source. In additional or alternative aspects, the power source may be removable such that when the power source is drained it may be removed and replaced with a fully charged power source, thereby minimizing the downtime of the pipe scanning system caused by draining of the power source due to scanning operations.

As described and illustrated above with reference to FIGS. 2A-2D, a housing 610 may be mounted on or to the drive carriage 642. The housing 610 may include one or more processors 612, a memory 614, and one or more communication interfaces 616. In some aspects, the one or more processors 612 may be the one or more processors 112 of FIG. 1, the memory 614 may be the memory 114 of FIG. 1, and the communication interfaces 616 may be communication interfaces of a communication and control system (e.g., the communication and control system 140 of FIG. 1). The memory 614 may store instructions (e.g., the instructions 116 of FIG. 1) executable by the one or more processors 612 to control operations of the pipe scanning system. For example, the instructions may be executed by the one or more processors 612 to activate the motor of the drive carriage 642 to cause the pipe scanning system to travel about the circumference of the pipeline along the track 640 in a particular direction as shown by arrow 606.

As described above, the pipe scanning system includes a detector 630 and an emitter 632. In aspects, the detector 630 may be an x-ray detector, such as the detector 120 of FIG. 1 or the detector 238 of FIGS. 2A and 4A. In aspects, the emitter 632 may be an x-ray emitter, such as the emitter device 130 of FIG. 1 or the emitter 236 of FIGS. 2A and 4A. The detector 630 may be coupled to the drive carriage 642 (or the housing 610) via an arm 620 and the emitter 632 may be coupled to the drive carriage 642 (or the housing 610) via an arm 622. In some aspects, each of the detector 630 may be coupled to the arm 620 via a bracket system 626, 636, and the emitter 632 may be coupled to the arm 622 via a bracket system 624, 634. The bracket systems used to couple the detector 630 and the emitter 632 to the arms 620, 622, respectively, may provide for adjustable mounting of the detector 630 and emitter 632. For example, the bracket system 624, 634 may enable the emitter 632 to be pivoted, rotated, or otherwise adjusted (as shown by arrow 602) to control the direction at which the emitter 632 outputs a scanning signal (e.g., the x-rays), and the bracket system 626, 636 may enable the detector 630 to be pivoted, rotated, or otherwise adjusted (as shown by arrow 604) to control the field of view of the detector 630 or the angle at which the detector 630 detects the scanning signal (e.g., the x-rays) output by the emitter 632.

It is noted that the exemplary pipe scanning system shown in FIGS. 6 and 7 is representative of a prototype pipe scanning system constructed to perform proof-of-concept testing for pipe scanning systems in accordance with the concepts disclosed herein. Exemplary details related to the proof-of-concept testing are described in more detail below. The pipe scanning system shown in FIGS. 6 and 7 enabled full 360° circumferential scans of sections of a pipe (e.g., an insulated pipe or a non-insulated pipe) to be obtained more rapidly and with higher resolution than currently available scanning systems. The improved imaging capabilities provided by the pipe scanning systems of embodiments may be particularly well suited for performing integrity and reliability inspections for insulated pipelines and in particular, detection of CUI, since the pipe scanning system may perform the inspection without requiring penetration of the insulation barrier. Additionally, the improved resolution provided by pipe scanning systems of the present disclosure may enable detection of moisture trapped within the insulation barrier but that may not have resulted in CUI at the time of scanning. This capability may enable preemptive actions to be performed to prevent CUI from occurring, thereby increasing the longevity of the pipeline and minimizing the likelihood that the pipeline needs to be shut down (e.g., to replace a section of pipe suffering from severe CUI). Moreover, it is to be understood that the prototype pipe scanning system shown in FIGS. 6 and 7 and described above was tested using a section of pipe, it should be understood that the prototype pipe scanning could readily be utilized to scan or inspect pipelines as described elsewhere herein. Thus, it should be recognized that the pipe scanning systems of embodiments may be utilized to perform scanning or inspection of pipes, piping, insulated pipelines, non-insulated pipelines, or other types of inspections where a 360° circumferential scan may be desired. Moreover, it should be understood that the pipe scanning systems of embodiments may be utilized to perform scans of non-circular pipes or objects since the track system may secured to any shape structure to enable the scanning devices to circumferentially travel about the structure and capture image data. Accordingly, embodiments of the present disclosure should not be limited to scanning pipes, piping, and/or pipelines.

It is noted that the exemplary configuration of the scanning system shown in FIGS. 6 and 7 may be configured to perform scanning and imaging through an interior portion of the pipeline (or other object being scanned), rather than using a tangential scan (e.g., a scan of an exterior surface of the pipeline), such as the scan described and illustrated with reference to FIG. 4A. To illustrate, in FIGS. 6 and 7 the emitter 236 and the detector 238 are arranged across from each other, as opposed to being offset as in the embodiment of FIG. 2A to facilitate the tangential scan, such that a scanning signal may be transmitted through a proximate wall of the pipeline 210 (and insulation 220) (e.g., a wall proximate the emitter 236) and a distal wall of the pipeline 210 (and insulation 220) (e.g., a wall distal to the emitter 236 but proximate the detector 238). This form of scan may be referred to as a double-wall-single-view (DWSV) and may enable damage on an interior of a pipeline to be detected without requiring access to the interior of the pipeline. Because the DWSV scanning technique enables the interior of the pipeline to be scanned without access to the interior of the pipeline, as is required by existing techniques, the DWSV scanning technique may enable the pipeline to be scanned for internal damage without disrupting operations of the pipeline (i.e., the pipeline may be scanned for internal damage while fluids are transported therein).

Referring to FIG. 14, a block diagram illustration aspects of performing a scan of an interior of a pipeline in accordance with aspects of the present disclosure is shown. In an aspect, the scan described with reference to FIG. 14 may be performed using the scanning system of FIGS. 6 and 7. As shown in FIG. 14, a scanning signal 1400 may be emitted by the emitter 236 and detected by the detector 238. Unlike the tangential scan of FIG. 4A, in which the scanning signal 400 is transmitted tangential to, or along the exterior surface of the pipeline (e.g., to capture information associated with defects in the exterior surface), the scanning signal 1400 transmitted by a scanning system performing DWSV scanning may pass through a wall proximate the emitter 236 and may be detected by the detector 238 after passing through distal wall. It is noted that the distance between the emitter 236 and the proximate wall (i.e., the wall closest to the emitter 236) may be relatively small (e.g., 1-3 centimeters (cm), 1-10 cm, 3-10 cm, etc.), which may limit the amount of information captured by the detector 238 that is associated with the proximate wall as compared to information captured by the detector 238 that is associated with the distal wall (i.e., the wall distal to the emitter but proximate the detector 238).

Figure 18A:
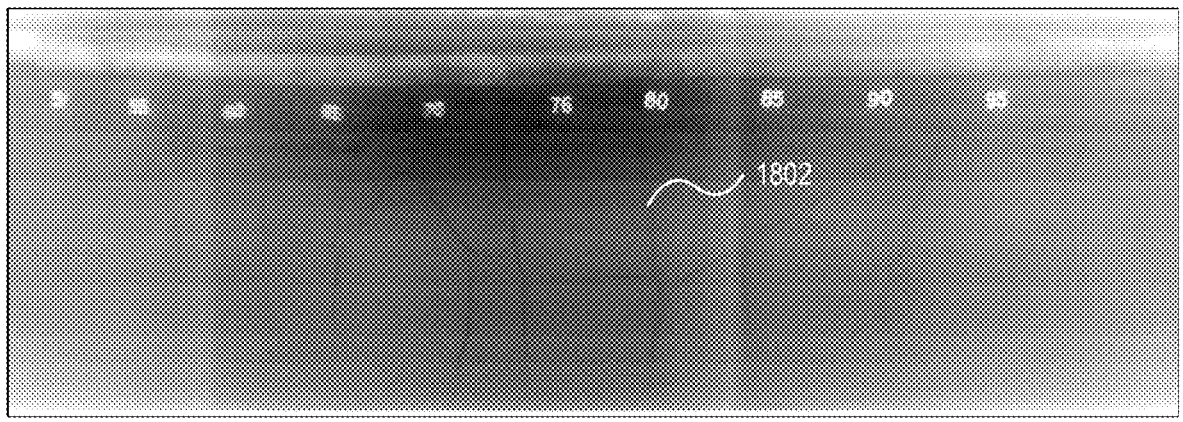
FIG. 18A shows image data captured using the double-wall-single-view (DWSV) scanning technique in accordance with aspects of the present disclosure.
Figure 18B:
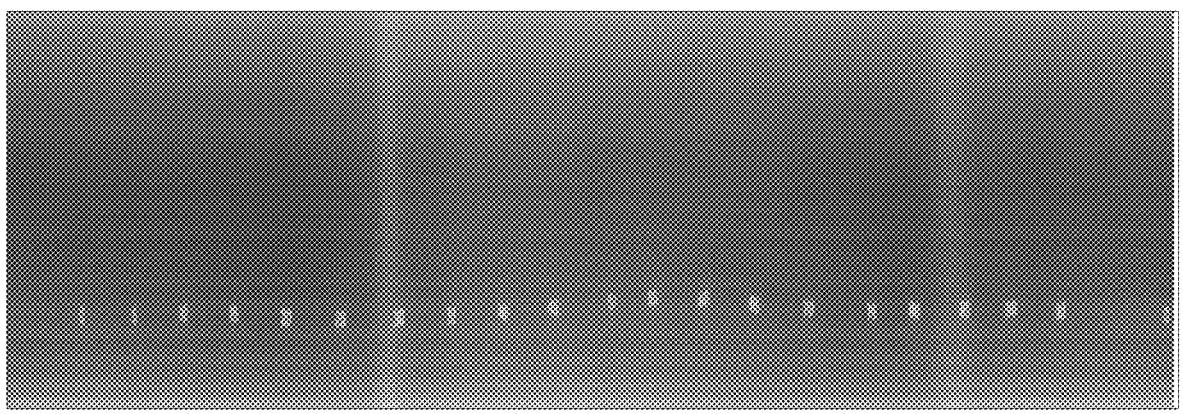
FIG. 18B shows image data captured using the double-wall-single-view (DWSV) scanning technique in accordance with aspects of the present disclosure.
Figure 18C:
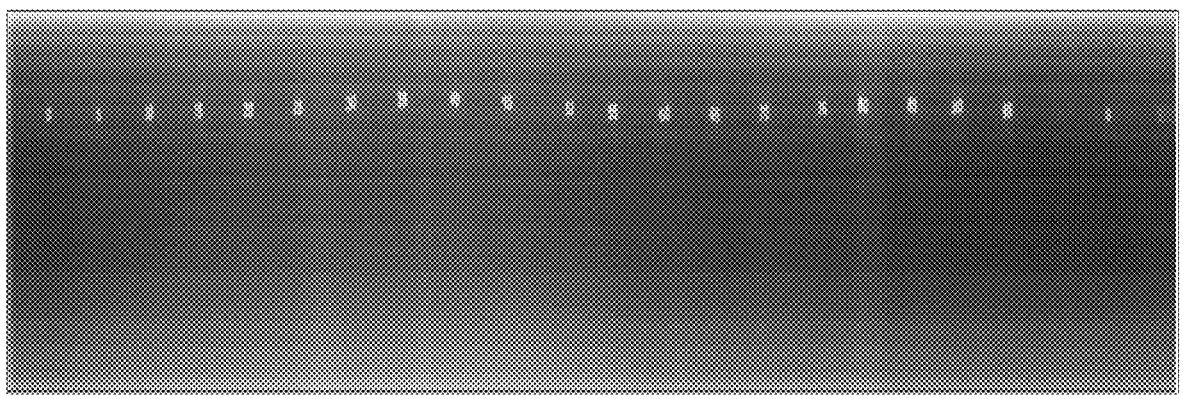
FIG. 18C shows image data captured using the double-wall-single-view (DWSV) scanning technique in accordance with aspects of the present disclosure.

As described above, the portions of the scanning signal 1400 detected by the detector 238 may be used to produce media content that includes information indicative of a characteristic of the pipeline 210. For example, the media content generated using the scanning signal 1400 and the DWSV scanning technique may include information representative of defects on an inside of the pipeline 210, such as corrosion on the internal surface of the pipeline, cracks in a cement lining of the pipeline 210, or other types of internal damage or defects present in the pipeline. In some aspects, scanning systems performing DWSV scanning may utilize linear detectors, which may be configured to capture image content representing a linear section of the scanned structure (e.g., a pipe, pipeline, piping, etc.), and multiple images may be captured during scanning of the entire section of the structure. In some aspects, the tangential scanning technique of FIG. 4A may utilize a detector array. FIGS. 18A-18C show representative image data captured using the DWSV scanning technique described above. As can be seen in FIG. 18A, the DWSV scanning technique was able to capture image data showing cracks 1802 in the cement lining of a pipeline.

As shown above with reference to FIGS. 14 and 18A-18C, a scanning system according to the present disclosure may be mounted external to a pipeline, piping, a pipe, or other structure and used to detect defects or damage on interior surfaces without requiring the scanned structure to be turned off or placed in a non-operational state (e.g., pipelines may continue to transmit fluids, such as natural gas, etc.). Utilizing a combination of the scanning techniques described in connection with FIGS. 2A, 4A, 6, 7, and 14 enables a scanning system to scan a structure (e.g., pipes, piping, pipelines, or other structures) for damage on an exterior surface (e.g., CUI, moisture in insulation, etc.) and an interior surface. While damage on the exterior surface may be readily viewed as irregularities on the surface of the scanned structure, as can be seen in FIGS. 5C and 5D where the surface of the structure is typically linear and defects (e.g., defects 502 and 504) are shown as bumps or valleys in the linear surface, damage to the interior surface may be less readily apparent. To illustrate, damage internal to the structure may include cracks (e.g., to a concrete liner of the pipeline, as in FIG. 18A) or corrosion.

Unlike CUI on the exterior of a pipeline, which may exfoliate and increase the thickness of the pipeline, which shows up as raised surfaces (FIG. 5C) when scanned by a tangential scanning system (e.g., the scanning system of FIG. 2A), corrosion on the interior surface of a pipeline may be subtractive (i.e., the corrosion creates a thinner wall of the pipe). The subtractive nature of the internal corrosion, coupled with the scan direction typically being perpendicular to the interior surface of the pipeline, as shown in FIG. 14, does not lend itself to the same detection mechanisms as the tangential scans and may be more difficult for a user to spot. In particular, the outputs of the DWSV scanning technique may include grayscale images, as shown in FIGS. 18A-18C, and differences in thickness (e.g., due to corrosion) may show up as different grayscale colors or intensities (e.g., different grayscale values may represent different wall thicknesses, where darker colors indicate thicker walls and lighter colors indicate thinner walls, such as may occur due to corrosion or vice versa). In some aspects, automatic feature recognition (AFR) may be used to make internal damage more easy to identify. For example, the AFR processing may analyze the grayscale output of the scanning system (e.g., a scanning system performing DWSV scanning) and detect changes in grayscale color or intensity that exceed a threshold change (e.g., a 500 grayscale change), such as a change representative of the presence of internal corrosion. Any areas of corrosion detected by the AFR processing based on changes in the grayscale color or intensity satisfying the threshold change may then be recolored (e.g., from a grayscale color to red, orange, yellow, etc.) when presented to a user in order to highlight areas of the scanned structure where internal corrosion may be present. It is noted that the threshold change may be configurable by the user (e.g., a user of the computing device 180 of FIG. 1 or another user), such as to enable different threshold changes to be configured for different wall thicknesses of pipes, piping, pipelines, and the like. Additionally, it is noted that more than one threshold change may be used if desired, and each different threshold may be utilized by the AFR processing to recolor the media content, such as to identify varying degrees of defects (e.g., severe, moderate, or light internal and/or external corrosion could each be recolored differently using different threshold change values).

It is noted that the ability to detect defects when using DWSV may depend on the diameter of the pipe, piping, pipeline, or other dimensions of the structure being scanned. For example, the scanning signal may be attenuated as it travels through the walls of the pipeline or structure, resulting in a lower power or intensity scanning signal being received at the detector 238. To address attenuation, a higher power emitter may be used. However, higher power emitters may increase the weight of the scanning system and so the particular emitter utilized in a given scanning system may be selected based on the dimensions of the structure to be scanned and additional modifications (e.g., more powerful motor, larger gears, etc.) to the scanning system may be made to compensate for any additional weight that may result.

As explained above, as the scanning is performed, media content representative of the outputs of the scanning (e.g., media content representative of the internal or external surface(s) of the scanned structure) may be transmitted to an external device, such as the computing device 180 of FIG. 1. A user may utilize the external device to view the streamed media content and not any defects that are detected. In some aspects, the user may take over control of the scanning system (e.g., the scanning system of FIG. 2A or the scanning system of FIGS. 6 and 7) upon detecting a damaged area of the scanned structure. During manual control mode, the user may control the scanning system to rescan the area where the damage was detected and provide instructions to the scanning system to capture higher resolution images of the damaged section. Once the user is finished viewing the damaged section, the scanning system may resume automatic scanning and complete the scanning of the structure.

Referring to FIG. 15, a block diagram illustrating additional aspects of providing lateral travel members for moving a scanning system along a length of a structure are shown. As described above with reference to FIGS. 12A-12G, scanning systems according to the present disclosure may utilize a plurality of lateral travel members (e.g., the plurality of lateral travel members 1210) to move a scanning system along a length of a pipe, pipeline, piping, or other structure. It is noted that while FIGS. 12A-12G suggest that the lateral travel members may be located underneath the track system (e.g., track support 1242 and track 1240), such illustration has been provided for purposes of illustration, rather than by way of limitation. Indeed, as shown in FIG. 15, lateral travel members may be located on a side of the track system. For example, FIG. 15 illustrates a lateral travel member 1510 located on a first side of the track support 1242 and the track 1244. The lateral travel member 1510 may include any of the lateral travel members described herein (e.g., lateral travel members of FIGS. 12B, 12G) or other types of lateral travel members. The lateral travel member 1510 may be configured to push the track system in the direction of arrow 1512 or pull the track system in the direction of arrow 1514 to move the scanning system along a length of the scanned structure. It is noted that the lateral travel member 1510 may be disposed on either side of the track system, as illustrated by lateral travel member 1510'.

Because lateral travel member 1510' is on an opposite side of track system as compared to lateral travel member 1510, lateral travel member 1510' may push the track system in the direction of arrow 1514 and/or pull the track system in the direction of arrow 1512 to move the scanning system along a length of the scanned structure. It is noted that in the exemplary embodiment of FIG. 15 where the lateral travel members 1510 (or 1510') are disposed on a side of the track system, one or more support structures may be disposed under the track system (e.g., between the track system and the surface of the structure being scanned). Such support structures may be configured to slide or roll across the surface of the structure (e.g., a pipe, pipeline, piping, pipeline insulation, etc.).

Figure 8A:
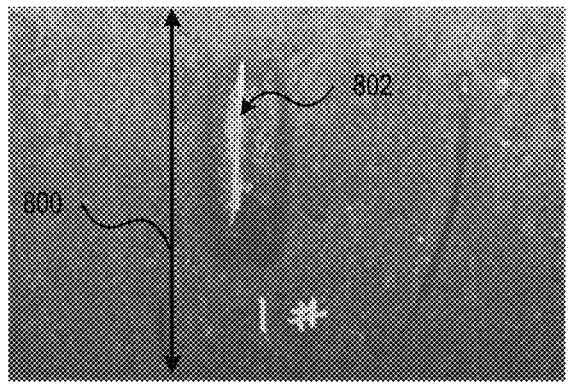
FIG. 8A is an image illustrating an experimental setup for detecting corrosion on an exterior surface of a pipeline using a pipe scanning system in accordance with the present disclosure.
Figure 8B:
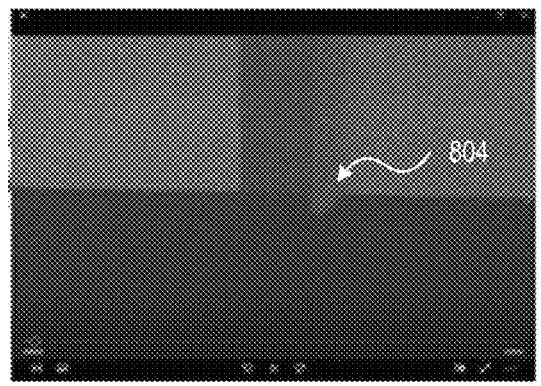
FIG. 8B is an image illustrating scan data obtained during scanning of the pipeline for the experimental setup of FIG. 8A.

Referring to FIG. 8A, an image illustrating an experimental setup for detecting corrosion on an exterior surface of a pipeline is shown. In particular, the image of FIG. 8A shows a surface of a pipe having a scratch or gouge 802 on its surface. Defects such as the scratch or gouge 802 may occur during installation of the pipeline (e.g., during transport, loading, unloading, etc. of the pipe used for the pipeline) or may occur after completion of the pipeline (e.g., if debris or other materials strike the pipeline). The section of the pipe having the scratch or gouge 802 was scanned in the direction indicated by line 800 using a prototype of a scanning system in accordance with the present disclosure, such as the scanning system configured as shown in FIGS. 6 and 7, and image data was obtained. The image data obtained during scanning of the pipe having the scratch or gouge 802 is shown in FIG. 8B. As can be seen in FIG. 8B, the surface of the pipe is predominately smooth, but a depression 804 at the location of the scratch or gouge 802 was observed. In the specific example shown in FIGS. 8A and 8B, the depth of the scratch or gouge 802 was 0.055" (1.4 mm). Thus, FIGS. 8A and 8B demonstrate that pipe scanning systems in accordance with the present disclosure can identify defects that result in loss of material from the exterior surface of pipes used for pipelines.

Figure 9A:
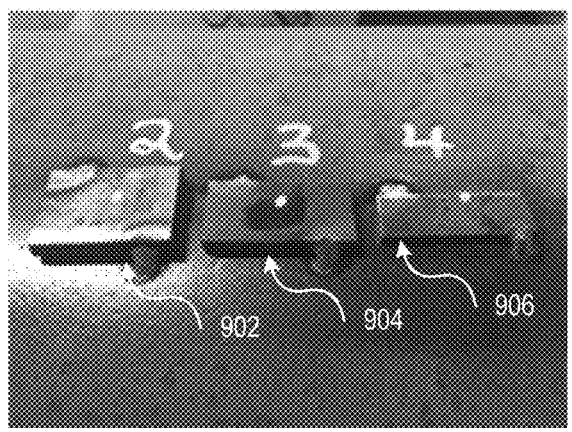
FIG. 9A is an image illustrating an experimental setup for detecting corrosion on an exterior surface of a pipeline using a pipe scanning system in accordance with the present disclosure.
Figure 9B:
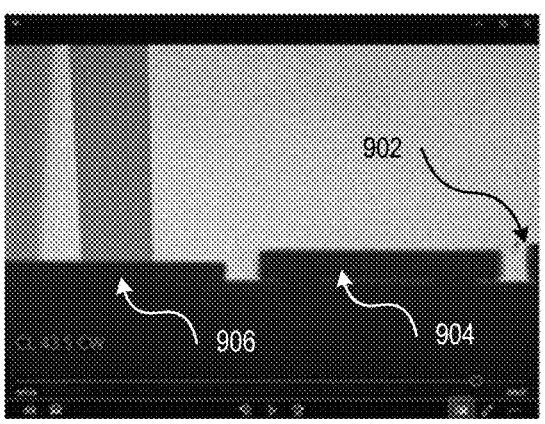
FIG. 9B is an image illustrating scan data obtained during scanning of the pipeline for the experimental setup of FIG. 9A.

Referring to FIG. 9A, an image illustrating an experimental setup for detecting corrosion on an exterior surface of a pipeline is shown. In the experimental setup of FIG. 9A, metal plates 902, 904, 906 were welded to an exterior surface of a pipe. The metal plates 902, 904, 906 had varying thicknesses, with the metal plate 902 being the thickest and the metal plate 906 being the thinnest. The section of the pipe where the metal plates 902, 904, 906 were located was then scanned using a pipe scanning system in accordance with the present disclosure, such as the scanning system configured as shown in FIGS. 6 and 7, and image data was obtained. The image data obtained during scanning of the pipe having the metal plates 902, 904, 906 is shown in FIG. 9B. As can be seen in FIG. 9B, the image data captured by the pipe scanning system was able to observe the changes to the profile of the pipe at the locations where the metal plates 902, 904, 906 were located. Thus, FIGS. 9A and 9B demonstrate that pipe scanning systems in accordance with the present disclosure can identify defects that result in an increase in material on the exterior surface of pipes used for pipelines, which is particularly relevant to corrosion of insulated pipelines (e.g., because the corrosion may result in exfoliation of the metal of the pipe, resulting in a protrusion of metal from the surface of the pipe).

Figure 10A:
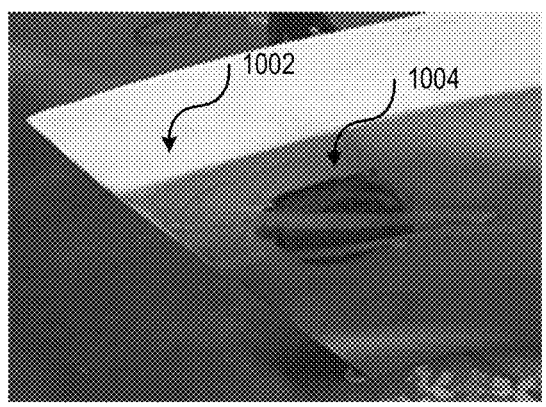
FIG. 10A is an image illustrating an experimental setup for detecting corrosion on an exterior surface of a pipeline using a pipe scanning system in accordance with the present disclosure.
Figure 10B:
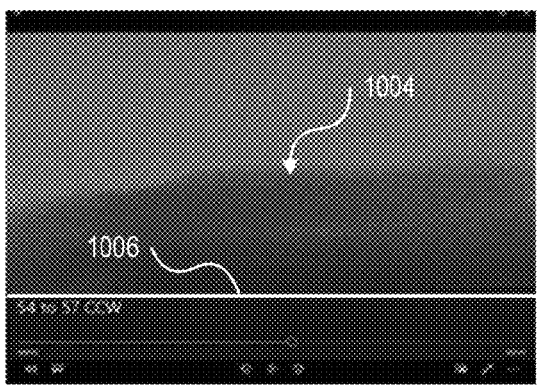
FIG. 10B is an image illustrating scan data obtained during scanning of the pipeline for the experimental setup of FIG. 10A.

Referring to FIG. 10A, an image illustrating an experimental setup for detecting moisture or other materials present in insulation of a pipeline is shown. In the experimental setup of FIG. 10A, steel wool 1004 was embedded in pipeline insulation 1002 and then wrapped around a pipe (not shown in FIG. 10A). The section of the pipe where the steel wool 1004 was embedded in the insulation 1002 was then scanned using a pipe scanning system in accordance with the present disclosure, such as the scanning system configured as shown in FIGS. 6 and 7, and image data was obtained. The image data obtained during scanning of the pipe wrapped in the insulation 1002 having the embedded steel wool 1004 is shown in FIG. 10B. As can be seen in FIG. 10B, the image data captured by the pipe scanning system was able to observe the abnormalities (e.g., cloudy regions) within the location where the steel wool 1004 was embedded in the insulation 1002. It is noted that in FIG. 10B, the surface of the pipe wrapped by the insulation 1002 is shown and emphasized by line 1006. Thus, FIGS. 10A and 10B demonstrate that pipe scanning systems in accordance with the present disclosure can identify defects with respect to the insulation of a pipeline. The ability to detect defects within the insulation of the pipeline may be advantageous because it may allow identification of regions of the insulation where moisture has become trapped in or by the insulation of a pipeline, which if caught early enough may prevent significant damage to the underlying pipe(s) and/or allow replacement of sections of the insulation without having to shut down the pipeline (i.e., because the pipe may not need to be replaced).

Figure 11A:
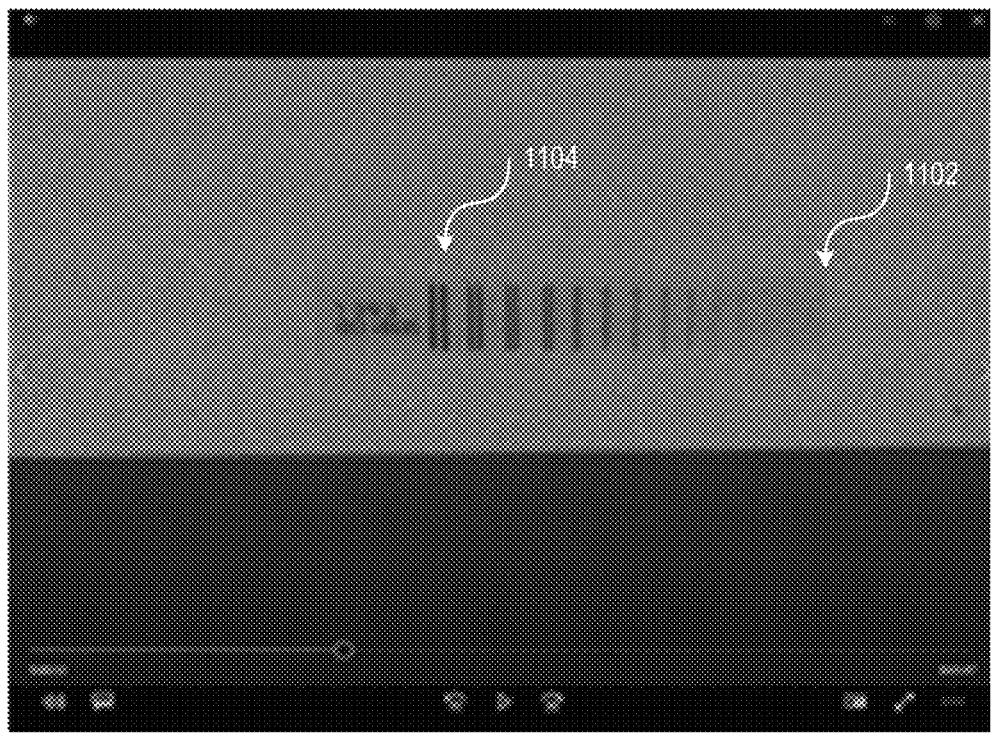
FIG. 11A is an image illustrating an experimental setup for evaluating imaging resolution of a pipe scanning system in accordance with the present disclosure.
Figure 11B:
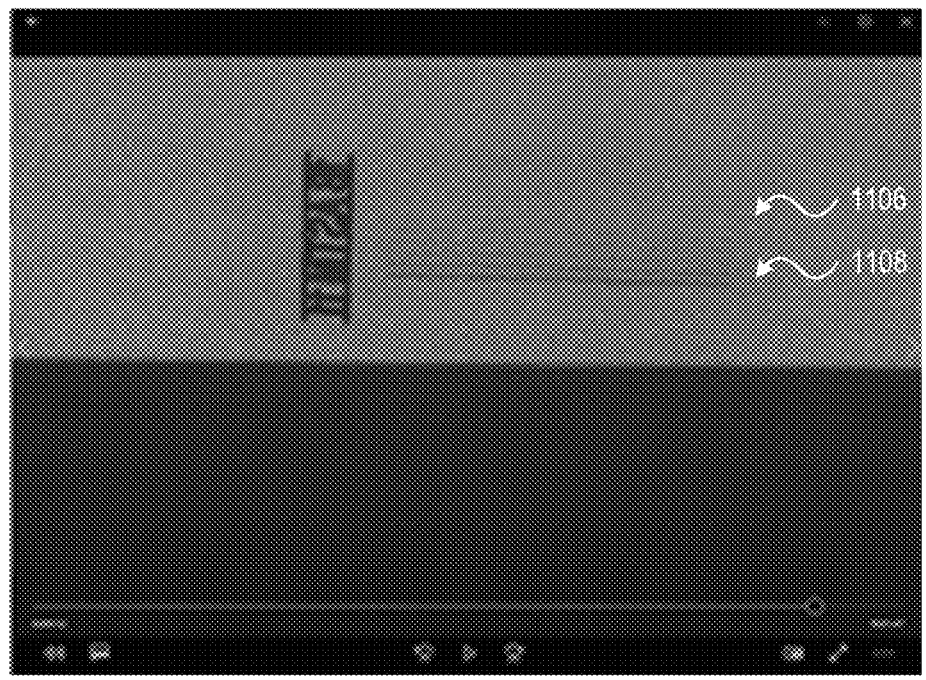
FIG. 11B is an image illustrating an experimental setup for evaluating image quality of a pipe scanning system in accordance with the present disclosure.

Referring to FIGS. 11A and 11B, images illustrating aspects of the imaging sensitivity of a pipe scanning system in accordance with aspects of the present disclosure are shown. In particular, FIG. 11A shows an image captured during a radiograph of duplex wire gauge analysis of an experimental setup for a pipe scanning system in accordance with the present disclosure and FIG. 11B is shows an image captured during image quality indicator (IQI) analysis of an experimental setup for a pipe scanning system in accordance with the present disclosure. In the experimental setup from which the image of FIG. 11A was captured, various wire pairs 1102 to 1104 having different gauges were imaged. Each of the wire pairs had a diameter that ranged from 0.0032" (0.08 mm) to 0.32" (8 mm). To evaluate the spatial resolution, the captured image was analyzed to identify the smallest line pair that shows at least 20% separation between the two wires. In the example shown in FIG. 11A, a wire pair with 0.50 mm of spacing was the smallest wire pair to show at last 20% separation, giving an unsharpness of 0.25 mm. In FIG. 11B, the IQI analysis was performed by imaging a set of wires 1106 to 1108 of different diameters ranging from 0.0032" (0.08 mm) to 0.32" (8 mm). During the IQI testing, a wire having a diameter of 0.025" (0.64 mm) was clearly visible, which suggests the sensitivity of the pipe scanning system can easily show indications (e.g., defects, abnormalities, etc.) of this size.

Referring to FIG. 12A, a block diagram illustrating exemplary aspects of a pipe scanning system in accordance with the present disclosure is shown. In FIG. 12A, a track system 1240 is shown surrounding the pipe 210 and the insulation 220 of FIG. 2A. Additionally, a plurality of lateral travel members 1210 are shown. As described above, the track system 1240 may enable the pipe scanning system to circumferentially scan (or at least partially circumferentially scan) the pipe 210 and the insulation 220 at a particular section of the pipeline (i.e., a section of the pipeline within the field of view of the detector and the emitter (e.g., an x-ray device). Once scanning of the particular section of the pipeline is complete, the lateral travel members 1210 may be utilized to move the pipe scanning system laterally along the length of the pipe to a next section of the pipeline to be scanned. As described above, the next section of the pipeline may or may not overlap with the section of the pipeline that was covered by the previous scan.

Referring to FIG. 12B, a block diagram of an exemplary lateral traversal member for a pipe scanning system in accordance with the present disclosure is shown. As shown in FIG. 12B, the lateral traversal members 1210 of FIG. 12A may include wheels 1212, a strut 1214, and an axle 1216. The strut 1216 may be configured to secure a wheel assembly (e.g., the wheels 1212 and axle 1216) to the track system 1240. A drive member 1218 may be provided to drive the wheels 1212 in a particular direction to facilitate lateral movement of the pipe scanning system along a length of the pipeline. In some aspects, the drive member 1218 may be an electronic motor that may be in wired or wireless communication with a control system (e.g., the communication and control system 140 of FIG. 1). As an illustrative example and referring to FIG. 12C, a section of the pipeline may be scanned at time (t=0). Upon completing the scanning of that section, the plurality of lateral travel members 1210 may be activated to move the pipe scanning system to a new section of the pipeline indicated by track system 1240', at time (t=1). Once at the new location, the pipe scanning system may scan the new section of the pipeline, as described above. It is noted that the pipe scanning system may be moved to additional locations along the length 1202 of the pipeline where additional sections of the pipeline may be scanned.

Figure 12G:
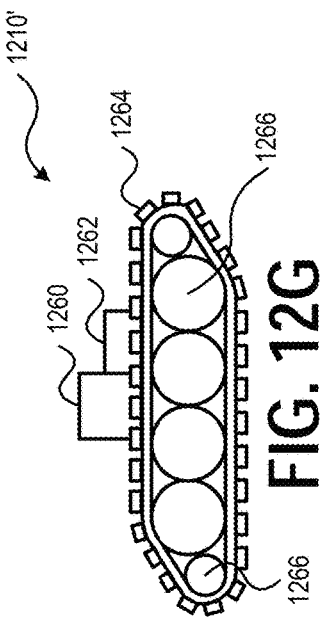
FIG. 12G a block diagram of additional aspects of a lateral traversal member for a pipe scanning system in accordance with the present disclosure.

In some aspects, pipe scanning systems in accordance with the present disclosure may not include lateral travel members. For example and referring to FIG. 12D, a block diagram illustrating aspects of a stationary pipe scanning system in accordance with the present disclosure is shown. Unlike the embodiment illustrated in FIG. 12A, where the track system 1240 is supported by the plurality of lateral travel members 1210, the track system 1240 shown in FIG. 12D may be supported by a plurality of structural supports 1220. The structural supports may be pads, pillars, rods, tubes, or other types of structures designed to support the track system 1240 and the weight of the pipe scanning system. It is noted that FIG. 12D shows the plurality of structural supports 1220 as including 4 structural supports for purposes of illustration, rather than by way of limitation and that pipe scanning systems in accordance with the present disclosure may include more than 4 structural supports or less than 4 structural supports in some implementations.

Figure 12E:
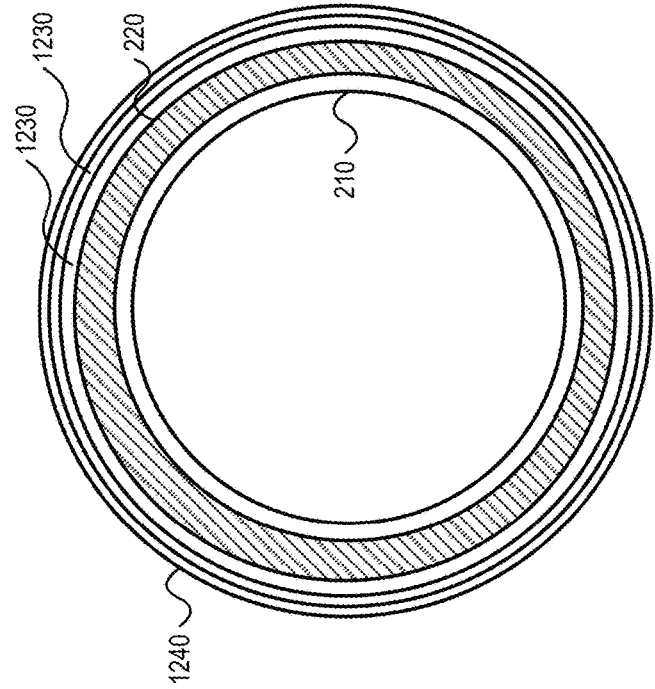
FIG. 12E is a block diagram illustrating additional aspects of a pipe scanning system in accordance with the present disclosure.
Figure 12D:
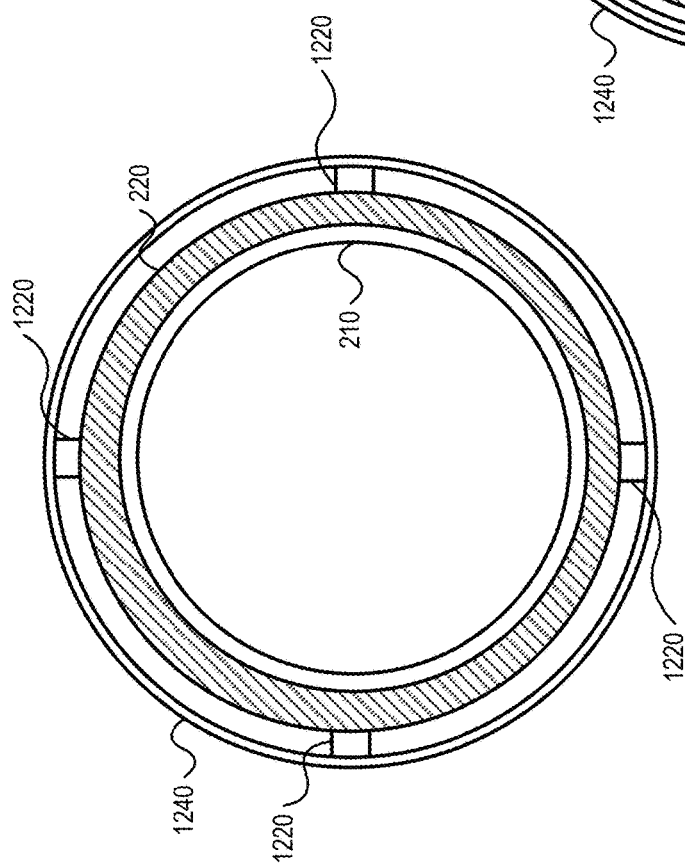
FIG. 12D is a block diagram illustrating aspects of a stationary pipe scanning system in accordance with the present disclosure.

In some aspects, as shown in FIG. 12E, one or more support layers 1230 may be wrapped around the pipeline (i.e., wrapped around the insulation for insulated pipelines or wrapped around the pipe for non-insulated pipelines). The one or more support layers 1230 may serve as a protective layer between the pipe scanning system and the exterior surface of the pipe 210 and/or the insulation 220. The one or more support layers may be formed from foam, rubber, or other materials suitable for supporting the track system 1240. In some aspects, the one or more support layers may include a metal protective layer as an outer layer (e.g., an aluminum outer layer). It is noted that when structural supports 1220 or the plurality of layers 1230 are utilized, the pipe scanning system may be secured to the pipeline at a particular location where scanning is desired, the scanning may be performed, and then the pipe scanning system may be manually removed (or loosened) and relocated to the next location of the pipeline where scanning is to be performed (i.e., instead of utilizing the plurality of lateral travel members 1210). In additional or alternative aspects, the one or more layers 1230 may be utilized in addition to the one or more lateral travel members 1210. Using the one or more layers 1230 in combination with the plurality of lateral travel members 1210 may protect the insulation from damage by the lateral travel members 1210 during movement of the pipe scanning system. It is noted that, in some aspects, the one or more support layers 1230 may be used as an alternative to utilizing structural supports 1220, while in other aspects the one or more support layers 1230 may be used in combination with the structural supports 1220. Using the one or more support layers 1230 in combination with the one or more structural supports 1220 may be beneficial for preventing damage to the insulation 220 by the plurality of structural supports 1220—however, in aspects where the one or more support layers 1230 are not used, the structural supports 1220 may be configured to prevent damage to the insulation (e.g., by providing a foot or pad having a large surface area over which the load of the pipe scanning system may be spread to minimize a likelihood that the supports poke through the insulation 220).

Figure 12F:
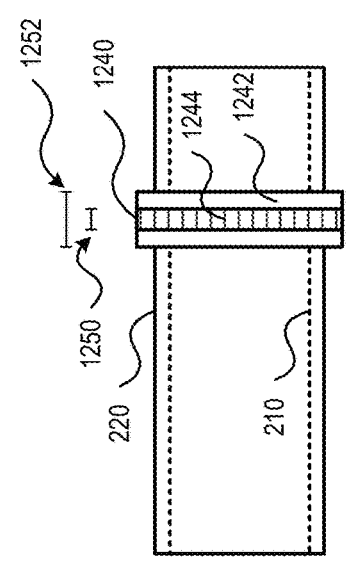
FIG. 12F is a block diagram illustrating additional aspects of a pipe scanning system in accordance with the present disclosure.

Referring to FIG. 12F, a block diagram illustrating additional aspects of the track system 1240 are shown. As shown in FIG. 12F, the track system 1240 may be secured to a pipeline, which may include a pipe 210 and insulation 220. As described above, the track system 1240 may be configured to allow the pipe scanning system to circumferentially scan the pipeline. To facilitate the scanning, the track system 1240 may include a track 1244. The track 1244 may be secured to a track support 1242, which may be formed from a rigid material (e.g., aluminum, steel, or other materials). As shown in FIG. 12F, the track support 1242 may have a width 1252 that is greater than a width 1250 of the track 1244. It is noted that in some implementations the track support 1242 and the track 1244 may have a same or approximately the same width or the track 1244 may have a greater width than the track support 1242. Providing the track support 1240 may improve stabilization of the drive carriage and imaging components of the pipe scanning system as it traverses the track 1244, which may improve the quality of media (e.g., images, video, etc.) captured during the scanning.

Referring to FIG. 12G, a block diagram of additional aspects of a lateral traversal member for a pipe scanning system in accordance with the present disclosure is shown. While FIG. 12B illustrates the lateral travel members as including wheels 1212, in some aspects the lateral travel members may not include wheels. For example, in the exemplary embodiment shown in FIG. 12G, a lateral travel member 1210' that utilizes a track or treads 1264, instead of wheels is shown. The track or treads 1264 may be formed from rubber or another material suitable for use with the pipeline. The track or treads 1264 may be driven by a motor 1262 and drive wheels 1266. A support 1260 may couple the lateral travel member 1210' to the track system 1240. It is noted that the lateral travel members 1210' may be oriented in a direction that is perpendicular to the circumference of the pipeline (parallel to the length of the pipeline) to enable the lateral travel members 1210' to move the pipe scanning system laterally along the length 1202 (FIG. 12C) of the pipeline.

It is noted that the lateral travel members 1210, 1210' have been described herein for purposes of illustration, rather than by way of limitation and that other types of lateral drive members may be utilized in accordance with the present disclosure. Moreover, it is noted that in some aspects circumferential travel members may be provided, which may facilitate movement of the pipe scanning system circumferentially around a section of the pipeline to facilitate scanning of that section (i.e., instead of using a track-based system). In such implementations, the circumferential travel members may utilize the lateral travel members 1210 or 1210', but the lateral travel members may be oriented to facilitate circumferential movement of the pipe scanning system, rather than oriented to facilitate lateral movement along the length of the pipeline.

Figure 13:
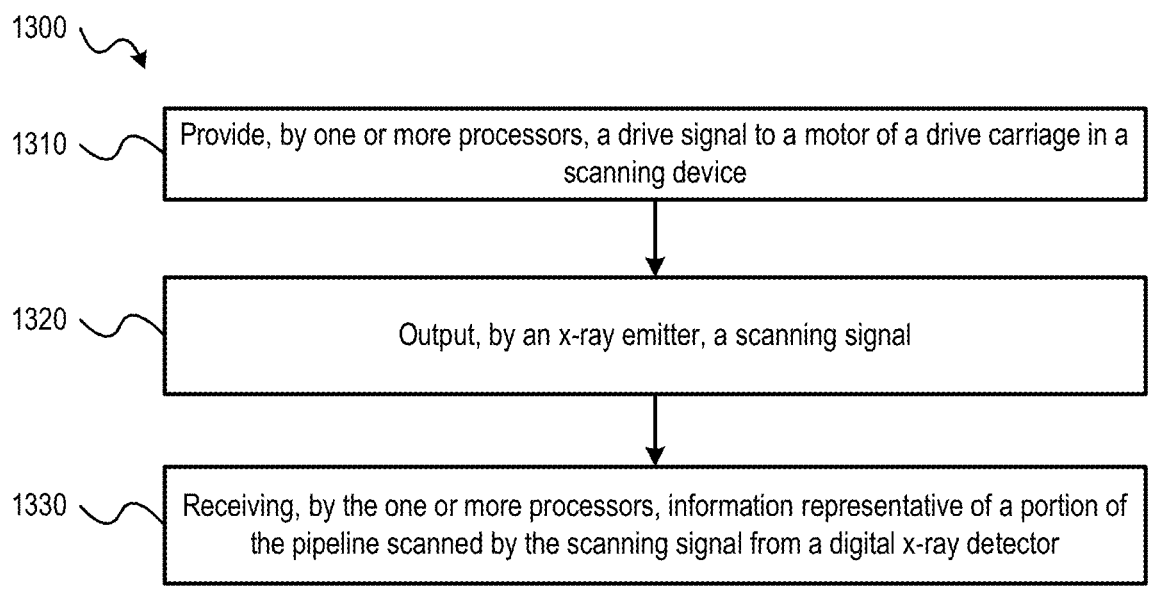
FIG. 13 is a flow diagram of a method for performing integrity inspect of a pipeline in accordance with aspects of the present disclosure.

Referring to FIG. 13, a flow diagram of a method for performing integrity inspect of a pipeline in accordance with aspects of the present disclosure is shown as a method 1300. In aspects, the method 1300 may be performed by any of the exemplary pipe scanning systems described above, such as the pipe scanning system 100 of FIG. 1, the pipe scanning system 200 of FIGS. 2A-2D, or the pipe scanning system of FIGS. 6 and 7. The method 1300 may facilitate scanning of pipelines, including insulated and non-insulated pipelines, via one or more circumferential scans of sections of the pipeline, as described above with reference to FIGS. 1-12G.

At step 1310, the method 1300 includes providing, by one or more processors, a drive signal to a motor of a drive carriage in a scanning device. As described above, the drive signal may be configured to cause the motor to drive one or more drive components (e.g., the drive components of FIGS. 2B-2D, in a particular direction along a track secured to a circumference of a pipeline. The scanning device may be moved about the circumference of the pipeline along the track based on the one or more drive components of the drive carriage being driven by the motor.

At step 1320, the method 1300 includes outputting, by an x-ray emitter, a scanning signal. As described above, the x-ray emitter may be coupled to the scanning device (e.g., the drive carriage or a housing of the scanning device) and the scanning signal may be output by the emitter as the scanning device is moved about the circumference of the pipeline. Outputting the scanning signal (i.e., x-rays) as the scanning device moves about the circumference of the pipeline may facilitate scanning of the entire circumference of a section of the pipeline (i.e., a 360° scan). In some aspects, the scan may be performed in a first direction and then performed a second time in a second direction for a single section of the pipeline (e.g., by driving the one or more drive components in a first direction and the driving the one or more drive components in a second direction opposite the first direction).

At step 1330, the method 1300 includes receiving, by the one or more processors, information representative of a portion of the pipeline scanned by the scanning signal from a digital x-ray detector. As described above, the information representative of a portion of the pipeline scanned by the scanning signal may include media content, such as image content or video content, that may include information associated with one or more defects present in the scanned section of the pipeline. For example, where the pipeline is an insulated pipeline, the one or more defects may include a CUI defect, moisture present in the insulation, a scratch in a surface of the pipe of the pipeline, or a combination thereof. It is noted that additional types of defects may also be identified. In some aspects, the media content may be transmitted to a remote computing device, as described above with reference to FIG. 1. In additional or alternative aspects, the media content may be stored at a memory of the scanning device.

As described above, the method 1300 and pipe scanning systems according to the present disclosure may provide several advantages over existing pipeline scanning technologies. For example, the method 1300 enables a section of an insulated pipeline to be scanned without disturbing (e.g., opening up) the insulation barrier. Additionally, the method 1300 enables scanning of a pipeline without requiring access to the interior of the pipes of the pipeline, thereby facilitating integrity and reliability inspections of pipelines to be performed without shutting down the pipeline. Moreover, the method 1300 and the scanning systems disclosed herein may be readily applied to any type of pipe, piping, or structure (e.g., including non-tubular structures) where a circumferential or 360° scan may be desired and are not limited to use with pipelines. The method 1300 may also provide higher resolution scanning of the pipeline, pipe, piping, or structure, which may enable more types of defects to be identified (e.g., CUI, moisture trapped within or under insulation of an insulated pipeline, or other defects). It is noted that the above-identified advantages have been provided for purposes of illustration, rather than by way of limitation and that the pipe scanning systems of the present disclosure and the method 1300 may also provide other advantages over existing pipe scanning systems.

It is noted that while the exemplary embodiments described above have been primarily described with reference to track systems that are suitable for providing 360° scans of pipes, pipelines, or piping, in some aspects, scanning systems of the present disclosure may utilize other types of track systems. For example and referring to FIG. 16, a block diagram illustrating additional exemplary aspects of a scanning in accordance with the present disclosure is shown. As described above, the scanning system of FIG. 16 includes the emitter 236 and the detector 238. The emitter 236 may be coupled to a carriage 1612 and the detector 238 may be coupled to a carriage 1614. The carriages 1612, 1614 may be similar to the carriages described above (e.g., carriages 1612, 1614 may include one or more motors, processors, memory, etc.). Unlike the scanning systems described above, which utilize circular tracks (e.g., due to the cylindrical shape of pipes, pipelines, and piping), the carriages 1612, 1614 may be configured to travel on linear tracks 1620, 1622, respectively.

Utilizing linear track systems may enable scanning systems according to the present disclosure to scan a structure 1602 having an irregular or non-cylindrical shape. It is noted that while FIG. 16 illustrates 2 linear tracks, scanning systems of embodiments may utilize more than two linear tracks if desired, such as to facilitate scanning of structure 1602 from additional directions (e.g., from the left and right sides in FIG. 16). Additionally, the linear track systems 1620, 1622 may be moved or rotated about the structure 1602 to facilitate 360° scans about the surface of the structure 1602. It is noted that the particular orientation of the tracks 1620, 1622, and the emitter 236 and the detector 238 may be configured to provide tangential scanning or DWSV scanning as desired. It is to be understood that the exemplary circular track systems and linear track systems are described herein for purposes of illustration, rather than by way of limitation and that scanning systems of the present disclosure may readily utilize other types of track systems, shapes of track systems, and the like to facilitate appropriate scanning of structures of interest. Moreover, it should be understood that while the embodiments of the present disclosure are primarily described with reference to scanning pipes, piping, or pipelines, the scanning systems disclosed herein may be readily utilized to scan other types of structures or objects, such as structures used in oil and gas refining (e.g., refractory vessels, columns, towers, regenerators, reactors, fractionators, evaporators, heaters, and the like), spacecraft or supporting components (e.g., rockets, boosters, fuel tanks, etc.), or other types of structures that may be subject to corrosion or other defects that may be detected using the scanning systems disclosed herein (e.g., structural or pressure containing components capable of where track system and scanning devices according to the present disclosure could be used).

Figure 17:
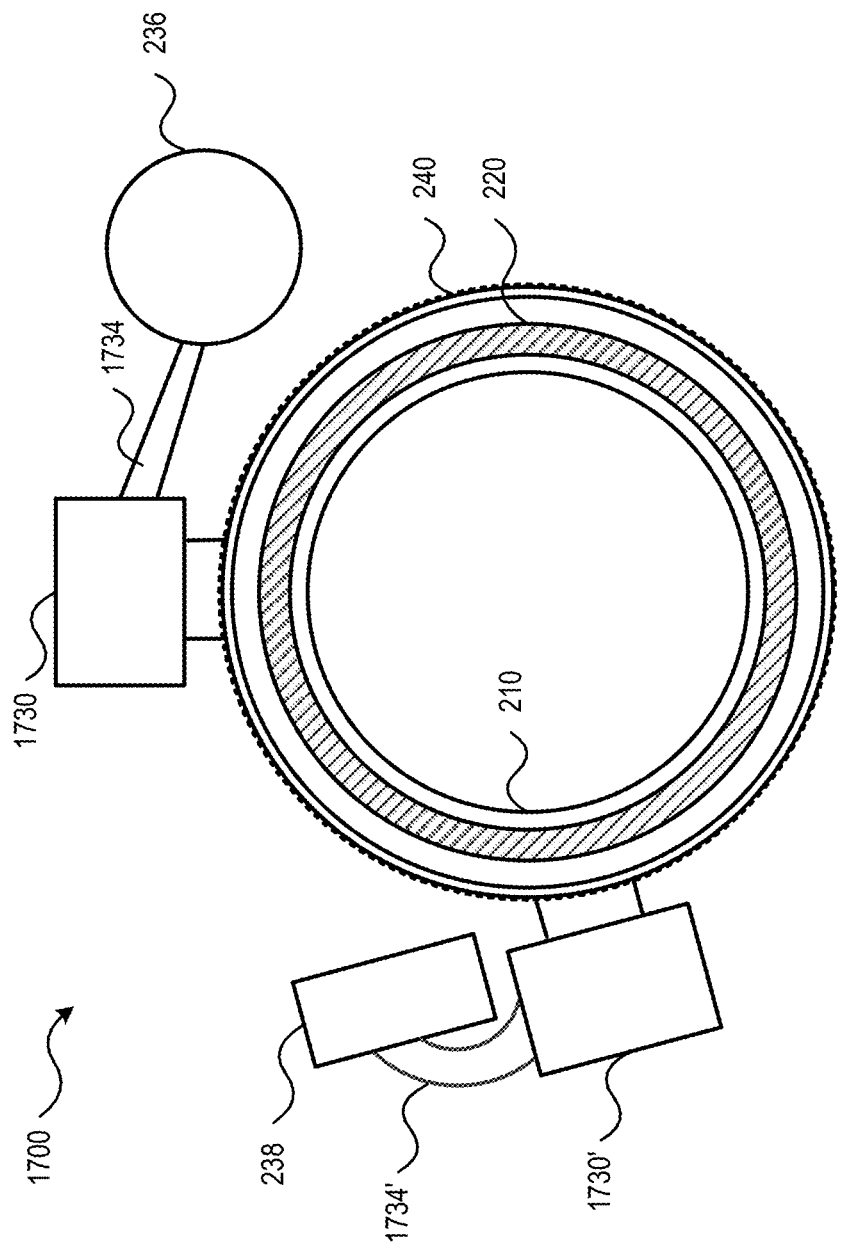
FIG. 17 is a block diagram illustrating an additional example of a scanning system in accordance with aspects of the present disclosure.

Referring to FIG. 17, a block diagram illustrating an additional example of a scanning system in accordance with aspects of the present disclosure is shown. In the example embodiment of FIG. 17, a scanning system similar to the scanning systems of FIGS. 2A, 6, and 7 is shown—however, unlike the embodiments shown in of FIGS. 2A, 6, and 7, the scanning system of FIG. 17 utilizes separate carriages for the emitter 236 and the detector 238. For example, the emitter 236 may be carried by a carriage 1730, which may be similar to the carriage 230/242 of FIG. 2A, and the detector 238 may be carried by a carriage 1730'. For example, carriages 1730, 1730' may include a housing including processors, memory, a motor or other components described with reference to housing/carriage 230/242. In some aspects, the emitter 236 and the detector 238 may be coupled to the carriages 1730, 1730', respectively, using arms. For example, the emitter 236 may be attached to carriage 1730 via arm 1734 and the detector 238 may be attached to carriage 1730' via arm 1734'. The carriages 1730, 1730' may be communicatively coupled to each other using wired or wireless communication links to enable communication between the two carriages and facilitate coordination and control of movement of the carriages in a synchronous manner. For example, the carriage 1730 may activate the emitter 236 and communicate the activation of the emitter 236 to the carriage 1730'. Subsequently, the carriage 1730' may activate the detector 238 and move along the track to locate the position where the detector 238 receives the highest energy scanning signal from the emitter. Once the highest energy location is determined, the carriages may communicate with each other over the wired or wireless communication links to synchronize scanning of the structure. Utilizing the location where the highest energy for the scanning signal may be detected by the detector 238 may enable the carriages 1730, 1730' to autonomously optimize their positions with respect to each other to improve the overall image quality and achieve a higher resolution.

It is noted that the scanning system shown in FIG. 17 may be configured to provide tangential scanning, as in FIG. 4A, and DWSV scanning, as in FIG. 14A, by controlling the locations of the carriages 1730, 1730' with respect to each other. For example, to facilitate tangential scanning, the carriages 1730, 1730' may be positioned such that the detector 238 is able to detection scanning signals emitted by the emitter 236 as described with reference to FIG. 4A. Subsequently, the carriages 1730, 1730' may be controlled to provide a scanning arrangement similar to that shown in FIG. 14, thereby enabling the scanning system to perform both tangential scanning and DWSV scanning, which enables information about defects present on the external surface of a pipe, piping, or pipeline, as well as the internal surface, to be detected in sequence. For example, the scanning system may configure the carriages such that the emitter 236 and detector 238 are aligned for tangential scanning and then perform one or more full 360° scans of the structure. Upon completing the tangential scans, the scanning system may modify the orientation of the carriages 1730, 1730' to align the emitter 236 and the detector 238 for performing DWSV scanning and may perform one or more DWSV scans of the structure. In this manner, media content associated with external and internal defects along the scanned section of the structure may be obtained prior to moving the scanning system laterally along the structure (e.g., using the lateral travel members or manually). The ability to dynamically reconfigure the scanning system to perform both tangential and DWSV scanning may enable structures to be scanned more quickly (e.g., because a tangential scanning system does not need to be mounted, used to scan, dismounted followed by mounting and scanning the structure using a DWSV scanning system). In some aspects, the arms 1734, 1734' may be configured to mechanically pivot (e.g., under control of a processor) to orient the emitter 236 and detector 238 in a proper alignment for tangential or SWSV scanning. For example, movement of the carriages 1730, 1730' may be used to control coarse alignment and orientation of the emitter 236 with respect to the detector 238, and then pivoting of the arms may be used to provide granular or fine tuning of the alignment or orientation of the emitter 236 and detector 238.

It is to be appreciated that various mechanisms may be utilized by scanning systems of the present disclosure to improve the quality of the images and media content captured during scanning, including both tangential scanning, as in FIG. 4A, and DWSV scanning, as in FIG. 14. For example, as the carriage(s) of a scanning system configured in accordance with the present disclosure travels about a track system the center of gravity for the components may shift. This shift may create what appears to be skips in the media content derived from the scanning signals detected by the detector and potentially create gaps or blurs in the media content. Additionally, as the carriages travel around the track system they may move inconsistently (e.g., more quickly or slowly) despite the motor being operated at a steady or same speed based on the location of the scanning system as it travels along the track (e.g., a scanning system coming from underneath a pipeline towards the top of the pipeline may travel more slowly than a scanning system coming from the top of the pipeline towards the bottom). Such fluctuations may be due to gravitational forces or other factors and may reduce the quality of the images or media content captured during scanning. Scanning systems in accordance with the present disclosure may provide features to address these challenges, as described in more detail below.

In some aspects, timing of an image acquisition process used to produce the images or media content output by the scanning system may be controlled and/or adjusted as the scanning system travels about the track system. To illustrate, the speed of travel for the scanning system may change as the scanning system travels about the scanned structure along the track system, as described above, and the image acquisition timing may be adjusted (e.g., increased or decreased) to account for changes in the speed of travel of the scanning system (e.g., image acquisition timing may be dynamically adjusted based a location of the scanning system relative to the structure being scanned). In this manner, image acquisition may be performed more quickly when the scanning system is moving more quickly (e.g., as the scanning system travels from the top of a pipeline towards the bottom of the pipeline) along the track system and may be performed more slowly when the scanning system is moving more slowly (e.g., as the scanning system travels from the bottom of the pipeline towards the top of the pipeline) along the track system. Adjusting the image acquisition process based on the speed of travel may improve the clarity or resolution of the images despite continuous movement of the scanning system as it traverses along the track system (e.g., the scanning system may not pause to facilitate image capture at various points as it traverses the track system unless user input instructing the scanning system to pause is received), and may also provide other enhancements.

Additionally or alternatively, the speed of travel of the carriage along the track system may be controlled to maintain a steady rate of travel regardless of where the scanning system is located. To illustrate, the amount of current delivered to the motor(s) used to drive the carriage along the track system may be adjusted to provide a constant rate of travel (e.g., more current being delivered when the scanning system travels from the bottom of the pipeline towards the top and less power when the scanning system travels from the top of the pipeline towards the bottom) despite the impact of gravitational forces or other factors that may impact the rate of travel of the scanning system. In some aspects, a combination of image acquisition control and motor control processes may be utilized to calibrate the image acquisition process to the speed of travel of the scanning system or for other reasons.

Figure 19A:
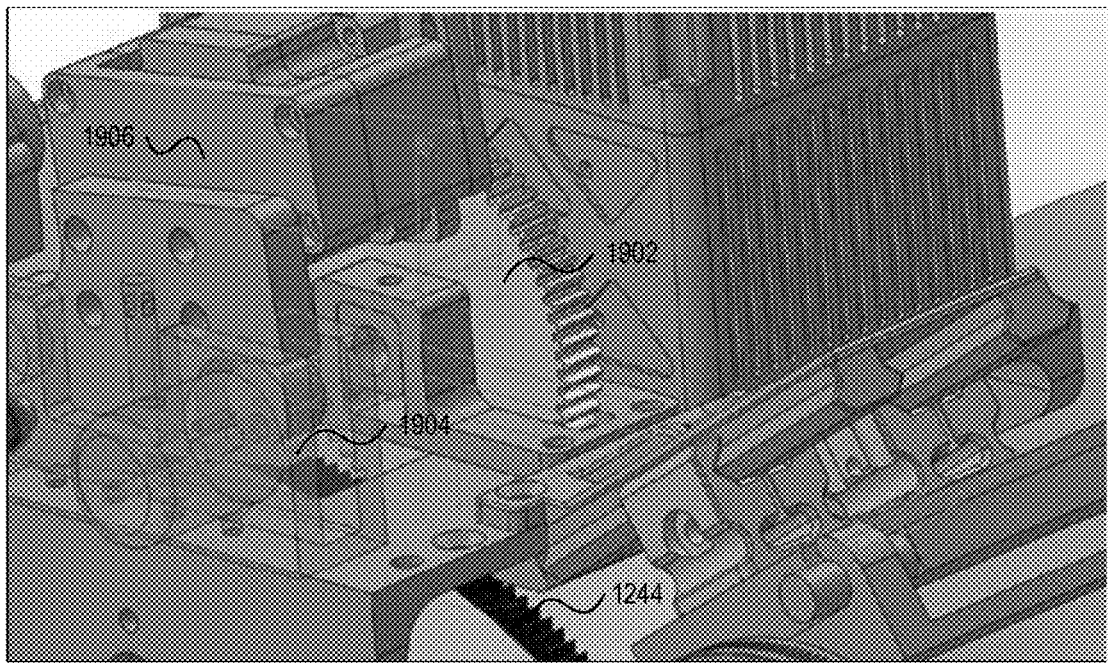
FIG. 19A shows a perspective view of a scanning system in accordance with the present disclosure.

The scanning systems disclosed herein may additionally or alternatively utilize other techniques to improve the quality of capture images and media content during operation of the scanning system. For example and referring to FIGS. 19A and 19B, a perspective view and a side view, respectively, of a scanning system in accordance with the present disclosure are shown. In FIG. 19A, components of a carriage system for moving the scanning system along a track, such as the track 1244 of FIG. 12F, are shown. In particular, a transfer gear 1902, a resilient member 1904, and a motor 1906 are shown. The resilient member 1904 may be configured to bias a motor gear (not shown in FIGS. 19A, 19B) driven by the motor 1906 such that the motor gear maintains good contact with the transfer gear 1902. The motor gear may be rotated at a speed corresponding to a speed of operation of the motor 1906, and as the motor gear rotates it may interface with teeth of the transfer gear 1902. In turn, the transfer gear may interface with the track system, such as to interface with teeth of the track 1244, to move the scanning system along the track system. By utilizing the resilient member 1904 to improve the contact between the motor gear and the transfer gear 1902, the scanning system may move along the track more smoothly despite potential shifts of the components of the scanning system, such as shifts that may occur when the scanning system passes an apex of a circular track system (e.g., when the scanning system switches from traveling uphill to travelling downhill).

As briefly described above, such shifts may create jumps or skips in the media content output by the scanning system, which may be due to the transfer gear 1902 losing contact with the track 1244 for brief periods of time. Such occurrences may create a jerk or jump as the transfer gear 1902 reengages the track 1244 and the jerks or jumps may reduce or degrade the image quality of the media content. As a result, certain defects within the field of view of the scanning system when the skips occur may be missed or blurred, which could result in a defect being present in the structure being scanned that goes undetected due to the poor image quality. Biasing the motor gear towards the transfer gear 1902 may ensure that the transfer gear 1902 maintains good contact with the track 1244, which enables the scanning system to more smoothly travel along the track 1244 and enables image or media content to be captured at a higher quality than would otherwise be possible (e.g., because the motor gear may lose contact with and fail to rotate the transfer gear 1902 when skips or jumps occur).

Figure 19B:
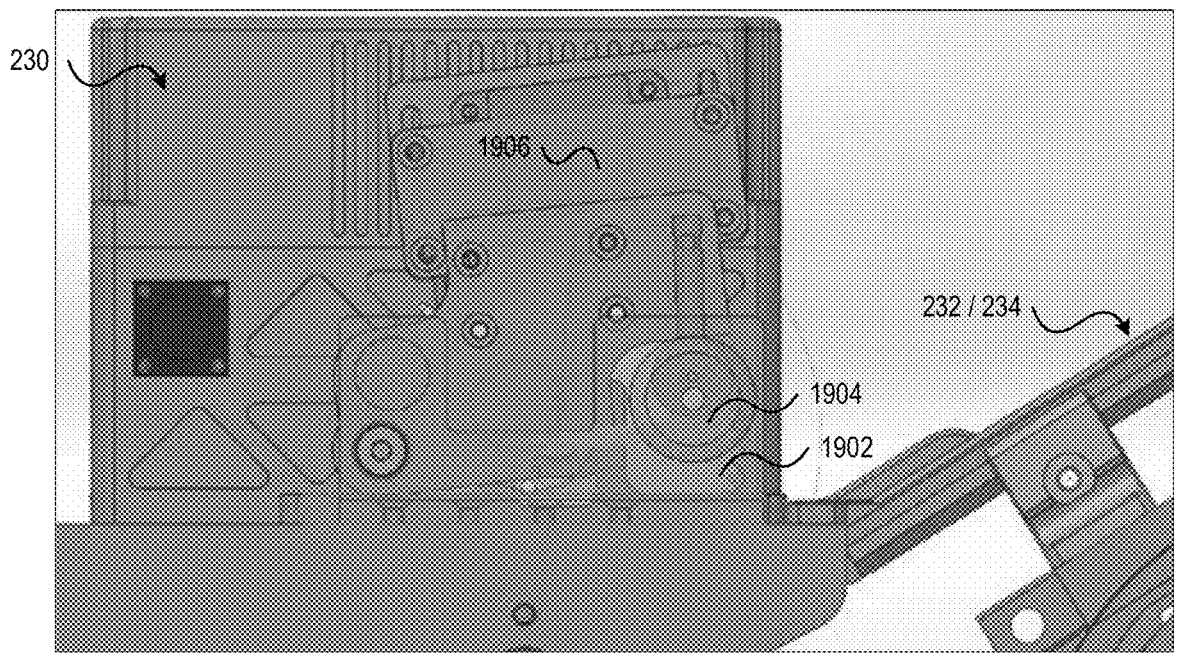
FIG. 19B is an image showing a perspective view illustrating additional aspects of scanning system in accordance with the present disclosure.

It is noted that the resilient member 1904 is shown as a leaf spring in the exemplary implementation shown in FIGS. 19A and 19B. However, it is to be understood that the resilient member is shown as a leaf spring for purposes of illustration, rather than by way of limitation and that other resilient members may be utilized to maintain contact between the motor gear and the transfer gear 1902, such as a coil spring or other form of resilient member. In addition to minimizing loss of driving force due to the improved contact between the motor gear and the transfer gear 1902, the bias of the motor gear towards the transfer gear 1902 provided by the resilient member 1904 may also ensure that the speed of rotation of the motor 1906 can be used to consistently control the speed of travel of the scanning system along the track. In embodiments where image acquisition is controlled or tuned based on the speed of the motor (or speed at which the scanning system travels along the track), the improved control over the speed of travel provided by utilizing the resilient member 1904 may enable improved synchronization with respect to adjusting or tuning the image acquisition processes based on the speed of travel (e.g., because the speed of travel may be more consistent). Additionally, the leaf spring provides an anti-backlash effect by keeping all the gears tightly meshed, even when there is a weight shift occurs as the scanning system travels around the scanned structure (e.g., a pipe, pipeline, piping, or other type of structure).

Figure 20A:
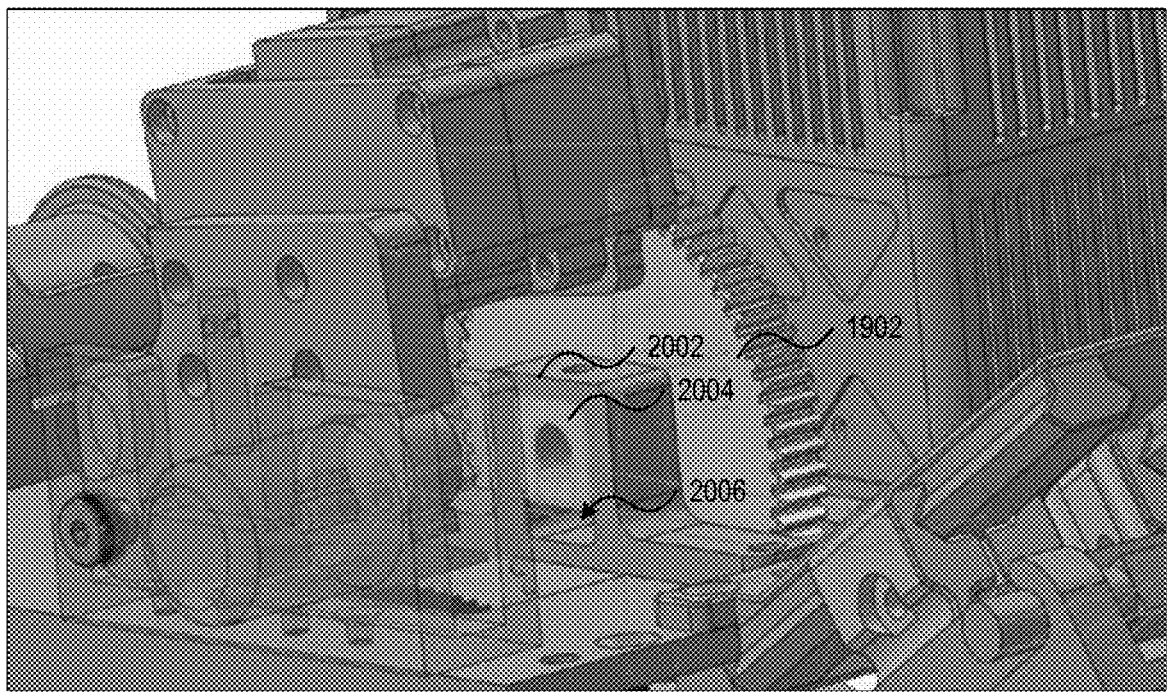
FIG. 20A is an image showing a perspective view illustrating additional aspects of scanning system in accordance with the present disclosure.
Figure 20B:
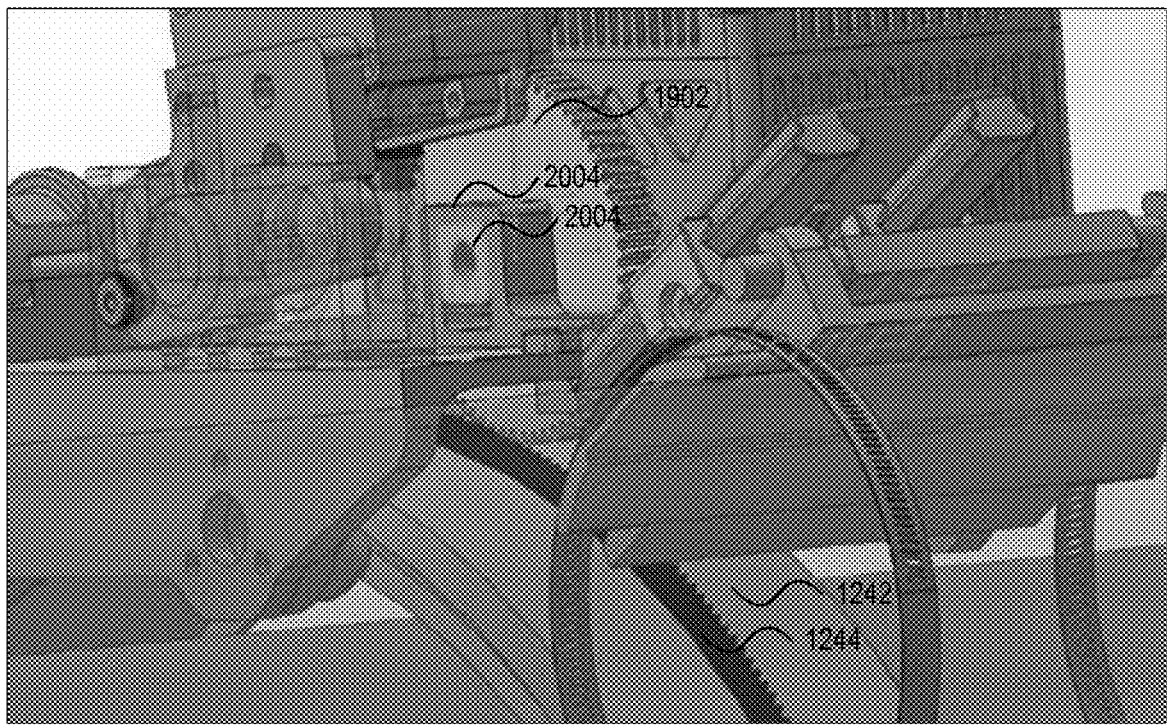
FIG. 20B is another image showing a perspective view illustrating additional aspects of scanning system in accordance with the present disclosure.

Referring to FIGS. 20A and 20B, perspective views showing additional aspects of scanning system in accordance with the present disclosure are shown. In FIGS. 20A and 20B, a mounting technique for improving the contact between the transfer gear 1902, the motor gear, and the track 1244 is shown. In particular, the transfer gear 1902 may be mounted using a floating mount that includes a mounting bracket 2002 and a floating member 2004. The floating member 2004 may be disposed within a channel 2006 of the mounting bracket 2002, and the transfer gear 1902 may be rotatably secured to the floating member 2004. The floating member 2004 may be configured to slide up and down within the channel 2006, thereby allowing the transfer gear 1902 and the floating member 2004 to move up and down within the channel 2006, which may help the transfer gear stay in contact with both the motor gear and the track 1244. The improved contact between the motor gear, the transfer gear 1902, and the track 1244 may provide for more consistent control of speed (e.g., because the transfer gear 1902 maintains improved contact with both the motor gear and the track 1244) in the event that weight shifts occur as the scanning system travels along the track system. Additionally, the tolerances for keeping the gears tightly meshed may be small and any slight deviation, whether from a component of the track system being slightly out of round or just from normal manufacturing differences, may cause the gears to spread apart enough for it to become an issue without the spring assembly. The ability to move up and down via the floating member 2004 enables the gears to remain tightly meshed despite the presence of such anomalies.

As shown above, scanning systems according to the present disclosure may realize improved image acquisition and travel speed/smoothness utilizing the above-described techniques. Such capabilities enable scanning systems to be operated in an improved manner that minimizes the chance that defects are missed during scanning (e.g., due to jitter, skips, jumps, etc.) or other causes. Additionally, the above-described techniques may provide enhanced control over the speed at which the scanning system travels, improving the ability to synchronize adjustments to image capturing processes with a travel speed of the scanning system. It is noted that the above-described improvements are provided for purposes of illustrating certain benefits realized by the disclosed scanning systems and that additional benefits or advantages may be realized by persons of ordinary skill in the art.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Additionally, it should be understood that scanning systems in accordance with the present disclosure have been described and illustrated with respect to specific embodiments for purposes of illustration, rather than by way of limitation and features of a particular embodiment may be utilized in combination with features described with respect to other embodiments. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

The invention claimed is:
1. A pipe scanning system for circumferentially scanning a pipeline, the pipe scanning system comprising:
a track system configured to secure to a circumference of a pipeline; and
a scanning device comprising:
a drive carriage comprising:
a motor;
a power source configured to provide power to the motor; and
one or more drive components in mechanical communication with the motor, wherein the one or more drive components, when driven by the motor, are configured to move the drive carriage about the circumference of the pipeline along the track system, the one or more drive components including a first gear driven by the motor, a second gear interfaced with the first gear and with the track system, and a resilient member arranged to bias the first gear towards the second gear;
an x-ray emitter configured to emit a scanning signal;
a digital x-ray detector configured to detect the scanning signal, wherein the x-ray emitter and the digital x-ray detector are configured to move with the drive carriage as the drive carriage moves about the circumference of the pipeline along the track system; and a control system in communication with the x-ray emitter, the digital x-ray detector, and the motor, wherein the control system is configured to:
  provide a drive signal to the motor to cause the motor to drive the one or more drive components in a particular direction;
  provide a control signal to the x-ray emitter, the x-ray emitter control signal configured to instruct the x-ray emitter to output the scanning signal; and
  receive information representative of a portion of the pipeline scanned by the scanning signal from the digital x-ray detector, wherein the information representative of the portion of the pipeline comprises information associated with one or more defects present in the pipeline.

2. The pipe scanning system of claim 1, wherein the pipeline is an insulated pipeline comprising a pipe surrounded by insulation, and wherein the track system is secured to the circumference of the pipeline on an exterior surface of the insulation.

3. The pipe scanning system of claim 2, wherein the one or more defects comprise a corrosion under insulation (CUI) defect.

4. The pipe scanning system of claim 2, wherein the one or more defects comprise moisture trapped within the insulation.

5. The pipe scanning system of claim 1, wherein the x-ray emitter is configured to continuously output the scanning signal as the drive carriage moves about the circumference of the pipeline along the track system.

6. The pipe scanning system of claim 1, wherein the track system comprises one or more lateral travel members in communication with the control system, the one or more lateral travel members configured to move the track system and the scanning device along a length of the pipeline in response to a lateral movement control signal provided by the control system.

7. The pipe scanning system of claim 6, wherein the lateral movement control signal is provided by the control system in response to completion of a scan of a first section of the pipeline, and wherein movement of the track system and the scanning device along the length of the pipeline is configured to facilitate scanning of a second section of the pipeline.

8. The pipe scanning system of claim 7, wherein the first section of the pipeline at least partially overlaps with the second section of the pipeline.

9. The pipe scanning system of claim 7, wherein the first section of the pipeline does not overlap with the second section of the pipeline.

10. The pipe scanning system of claim 1, further comprising:
  a remote computing device;
  wherein the scanning device comprises a communication interface communicatively coupling the scanning device to the remote computing device, and
  wherein the control system is configured to transmit the information representative of the portion of the pipeline scanned by the scanning signal to the remote computing device via the communication interface.

11. The pipe scanning system of claim 8, wherein the information representative of the portion of the pipeline scanned by the scanning signal comprises media content.

12. The pipe scanning system of claim 1, wherein the scanning device comprises a memory, and wherein the control system is configured to store the information representative of the portion of the pipeline scanned by the scanning signal at the memory.

13. The pipe scanning system of claim 1, wherein the control system if configured to provide a first drive signal to the motor to cause the motor to drive the one or more drive components in a first direction and to provide a second drive signal to the motor to cause the motor to drive the one or more drive components in a second direction that is opposite the first direction.

14. The pipe scanning system of claim 1, wherein the x-ray emitter is coupled to the drive carriage via a first arm, and wherein the digital x-ray detector is coupled to the drive carriage via a second arm.

15. The pipe scanning system of claim 14, wherein an orientation of the x-ray emitter is adjustable to control a direction of transmission of the scanning signal, and wherein an orientation of the digital x-ray detector is adjustable to control a field of view for detecting the scanning signal.

16. The pipe scanning system of claim 1, wherein the information representative of the portion of the pipeline scanned by the scanning signal comprises a full 360° circumferential scan of a section of the pipeline.

17. A method for circumferentially scanning a pipeline, the method comprising:
  providing, by one or more processors, a drive signal to a motor of a drive carriage a scanning device, the drive signal configured to cause the motor to drive one or more drive components in a particular direction along a track secured to a circumference of a pipeline, wherein the scanning device is moved about the circumference of the pipeline along the track based on the one or more drive components of the drive carriage being driven by the motor wherein the one or more drive components include a first gear driven by the motor, a second gear interfaced with the first gear and with the track, and a resilient member arranged to bias the first gear towards the second gear;
  outputting, by a x-ray emitter, a scanning signal, wherein the x-ray emitter is coupled to the scanning device, and wherein the scanning signal is output by the x-ray emitter as the scanning device is moved about the circumference of the pipeline; and
  receiving, by the one or more processors, information representative of a portion of the pipeline scanned by the scanning signal from a digital x-ray detector, wherein the information representative of a portion of the pipeline scanned by the scanning signal comprises information associated with one or more defects present in the portion of the pipeline.

18. The method of claim 17, wherein the pipeline is an insulated pipeline comprising a pipe surrounded by insulation, and wherein the one or more defects comprise a corrosion under insulation defect, moisture present in the insulation, a scratch in a surface of the pipe of the pipeline, or a combination thereof.

19. The method of claim 18, wherein the portion of the pipeline is scanned without disturbing the insulation.

20. The method of claim 17, wherein the information representative of a portion of the pipeline scanned by the scanning signal comprises image content, video content, or both, and wherein the method further comprises:
  transmitting media content to a remote computing device.

21. The pipe scanning system of claim 1, wherein the resilient member biasing the first gear towards the second gear maintains the second gear in contact with the track system as the drive carriage moves along the track system.

22. The pipe scanning system of claim 1, wherein the drive carriage further comprises a bracket and a member configured to slide within a channel of the bracket, wherein the member is rotatably secured to the second gear.

* * * * *